(12) United States Patent
Newman

(10) Patent No.: US 10,564,302 B1
(45) Date of Patent: *Feb. 18, 2020

(54) ONE-DIMENSIONAL DIRECTIONAL PARTICLE DETECTOR

(71) Applicant: David Edward Newman, Poway, CA (US)

(72) Inventor: David Edward Newman, Poway, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/434,511

(22) Filed: Jun. 7, 2019

Related U.S. Application Data

(63) Continuation of application No. 16/130,855, filed on Sep. 13, 2018, now Pat. No. 10,330,804.

(60) Provisional application No. 62/726,295, filed on Sep. 2, 2018, provisional application No. 62/661,072, filed on Apr. 22, 2018, provisional application No. 62/626,115, filed on Feb. 4, 2018.

(51) Int. Cl.

| | | |
|---|---|---|
| *G01T 1/29* | (2006.01) | |
| *G01T 5/00* | (2006.01) | |
| *G01T 1/167* | (2006.01) | |
| *G01N 23/04* | (2018.01) | |
| *G01T 3/06* | (2006.01) | |
| *G01T 1/20* | (2006.01) | |
| *G01T 3/00* | (2006.01) | |
| *G01V 5/00* | (2006.01) | |

(52) U.S. Cl.
CPC ................ *G01T 3/00* (2013.01); *G01T 1/20* (2013.01); *G01T 3/06* (2013.01); *G01V 5/0008* (2013.01)

(58) Field of Classification Search
CPC .... G01T 1/20; G01T 3/00; G01T 3/06; G01T 1/2907; G01T 3/065; G01T 1/167; G01V 5/00; G01V 5/0091; G01V 5/0016; G01N 23/04
USPC ..................................................... 250/370.09
See application file for complete search history.

(56) References Cited

U.S. PATENT DOCUMENTS

| | | | |
|---|---|---|---|
| 3,047,721 A | 9/1959 | Folsom | |
| 3,436,539 A | 4/1969 | Wilcox | |
| 3,581,090 A | 5/1971 | Brown | |
| 4,785,168 A * | 11/1988 | Ruscev | G01T 1/2935 250/390.12 |
| 5,345,084 A | 9/1994 | Byrd | |
| 5,665,970 A * | 9/1997 | Kronenberg | G01T 1/18 250/336.1 |
| 6,100,530 A * | 8/2000 | Kronenberg | G01V 5/06 250/267 |
| 7,026,627 B2 | 4/2006 | Fowler | |

(Continued)

*Primary Examiner* — Taeho Jo

(57) ABSTRACT

A device for determining the location of a source of radiation, based on data acquired at a single orientation of the device without iteration or rotations. Embodiments may comprise two side detector panels flanking a shield layer, plus a front detector positioned orthogonally in front of the side detectors. The various detectors thereby have contrasting angular sensitivities, so that a predetermined angular correlation function can determine the sign and magnitude of the source angle according to the detection rates. Rapid detection and localization of nuclear and radiological weapon materials enables greatly improved inspection of cargo containers and personnel. Advanced detectors such as those disclosed herein will be needed in the coming decades to protect against clandestine weapon transport.

20 Claims, 22 Drawing Sheets

(56) References Cited

U.S. PATENT DOCUMENTS

| | | | |
|---|---|---|---|
| 7,470,909 B2 | 12/2008 | Larsson | |
| 7,655,912 B2 | 2/2010 | Shirakawa | |
| 7,734,447 B2 | 6/2010 | Shirakawa | |
| 7,952,079 B2 | 5/2011 | Neustadter | |
| 7,994,482 B2 | 8/2011 | Frank | |
| 8,067,742 B2 | 11/2011 | Winso | |
| 8,101,919 B2 * | 1/2012 | Madden | G01T 1/202 250/367 |
| 8,198,600 B2 | 6/2012 | Neustadter | |
| 8,242,456 B1 | 8/2012 | Hecht | |
| 8,247,776 B2 | 8/2012 | Peng | |
| 8,319,188 B2 | 11/2012 | Ramsden | |
| 8,796,636 B2 | 8/2014 | Kline | |
| 8,930,165 B2 | 1/2015 | Vilim | |
| 9,158,012 B2 | 10/2015 | Willis | |
| 9,190,250 B2 * | 11/2015 | Takeuchi | H01J 47/08 |
| 9,575,189 B2 | 2/2017 | Groves | |
| 9,759,823 B1 * | 9/2017 | Dowell | G01T 7/00 |
| 9,864,074 B1 * | 1/2018 | Newman | G01T 1/2907 |
| 10,024,985 B1 | 7/2018 | Newman | |
| 2004/0238751 A1 * | 12/2004 | Penn | G01T 3/00 250/390.01 |
| 2005/0121618 A1 | 6/2005 | Fowler | |
| 2006/0065840 A1 | 3/2006 | Joung | |
| 2007/0085014 A1 * | 4/2007 | McIntyre | G01T 1/172 250/367 |
| 2007/0152160 A1 * | 7/2007 | Rowland | G01V 5/0008 250/363.02 |
| 2007/0221854 A1 * | 9/2007 | Shirakawa | G01T 1/169 250/367 |
| 2008/0048123 A1 | 2/2008 | Larsson | |
| 2008/0128631 A1 * | 6/2008 | Suhami | G01T 5/02 250/370.09 |
| 2008/0251728 A1 * | 10/2008 | Madden | G01T 1/2008 250/367 |
| 2009/0271143 A1 * | 10/2009 | Shirakawa | G01T 1/2018 702/150 |
| 2009/0309032 A1 * | 12/2009 | Ramsden | G01T 1/1644 250/370.1 |
| 2010/0006769 A1 | 1/2010 | Kraft | |
| 2010/0046690 A1 * | 2/2010 | Proctor | G01V 5/0091 376/154 |
| 2010/0072385 A1 * | 3/2010 | Peng | G01T 1/172 250/394 |
| 2010/0090115 A1 * | 4/2010 | Lerch | G01T 1/161 250/366 |
| 2010/0320390 A1 * | 12/2010 | McKinsey | G01T 1/204 250/362 |
| 2011/0198510 A1 * | 8/2011 | Neustadter | G01T 1/2907 250/394 |
| 2012/0043467 A1 * | 2/2012 | Gueorguiev | G01T 1/2907 250/363.01 |
| 2012/0256094 A1 * | 10/2012 | Pozzi | G01V 5/0091 250/366 |
| 2013/0053686 A1 * | 2/2013 | Pani | G01T 1/161 600/424 |
| 2013/0240749 A1 * | 9/2013 | Imholt | G01T 3/008 250/390.12 |
| 2013/0329859 A1 | 12/2013 | Groves | |
| 2014/0361190 A1 * | 12/2014 | Willis | G01T 1/2907 250/394 |
| 2015/0097122 A1 * | 4/2015 | Nakamura | G01T 3/06 250/367 |
| 2017/0261623 A1 * | 9/2017 | Florido | G01T 1/1648 |
| 2017/0363768 A1 * | 12/2017 | Berheide | G01V 5/101 |
| 2019/0094390 A1 * | 3/2019 | Polf | G01T 1/202 |

* cited by examiner

ONE-DIMENSIONAL DIRECTIONAL PARTICLE DETECTOR

CROSS REFERENCE TO RELATED APPLICATIONS

This application is a continuation of U.S. patent application Ser. No. 16/130,855, filed on Sep. 13, 2018, which claims the benefit of U.S. Provisional Patent Application No. 62/626,115 filed on Feb. 4, 2018, and U.S. Provisional Patent Application No. 62/661,072 filed on Apr. 22, 2018, and U.S. Provisional Patent Application No. 62/726,295 filed on Sep. 2, 2018, the entire disclosures of which are incorporated by reference as part of the specification of this application.

FIELD OF THE INVENTION

The present invention relates generally to nuclear weapon detection. More particularly, the present invention is directed in one exemplary aspect to a radiation detector that determines the direction of a radiation source in one dimension.

BACKGROUND

The easiest way to attack a country with a nuclear weapon is by shipping the weapon to the target nation as cargo. A rogue state or terrorist organization that manages to acquire a nuclear weapon could pack it into a maritime cargo container, railcar, truck, or even a large van. Once inside the target nation, the weapon could be sequestered in an urban environment, a government center, or adjacent to a military base for unlimited extortion or a devastating attack at any moment.

Nuclear weapons are hard to detect. They are radioactive but not highly so, and standard shielding can reduce the radiation signature further. The primary signature of a nuclear weapon is MeV-range neutrons and gamma rays, along with low-energy neutrons moderated by surrounding materials. The main inspection challenge is to detect these particles in the presence of natural backgrounds and benign radioactive substances that are commonly present in cargo and in the environment. Backgrounds also include cosmic rays (principally muons and electrons), gamma rays from radioactive materials in the soil, plus occasional low-energy neutrons generated by cosmic ray interactions in the atmosphere.

A major advantage would be a gamma ray or neutron detector that indicates where the radiation is coming from. The directional information would greatly enhance the statistical power of each detection, since a small number of particles all coming from a specific location would trigger a secondary inspection immediately.

What is needed, then, is an efficient detector of gamma rays or neutrons or both, with high sensitivity in the energy ranges expected for clandestine weapons, and capable of determining the location of the source, rapidly and without searching or iteration. Such a detector should have sufficient sensitivity to localize even a well-shielded nuclear weapon among clutter and obfuscation, automatically, and at low cost. Such a detector would greatly enhance security against clandestine nuclear and radiological weapons, and would also speed up legitimate border traffic by passing clean loads quickly. And, when a secondary inspection is triggered, the inspectors could use the indicated source location as a starting point.

SUMMARY OF THE INVENTION

Disclosed herein are systems for the detection and localization of a radioactive source. In an exemplary aspect, a device is described. In one embodiment, the device includes one slab-shaped shield, two side detectors, a front detector, and a processor. The shield may be configured to block most particles incident orthogonally thereon from the source, and may be oriented parallel to an aiming plane that runs centrally from the back to the front of the device. The side detectors may be positioned parallel to the shield on opposite sides of the shield respectively. The front detector may be positioned frontward of the side detectors and oriented perpendicular to the aiming plane. The side detectors and the front detector may be configured to detect energetic electrons or ions and to emit signals upon detecting the particles. The processor may be configured to calculate the sign of the source angle based at least in part on the signals from the side detectors, and to calculate the magnitude of the source angle based at least in part on signals from the front detector.

DETAILED DESCRIPTION OF INVENTION

Figure 1:
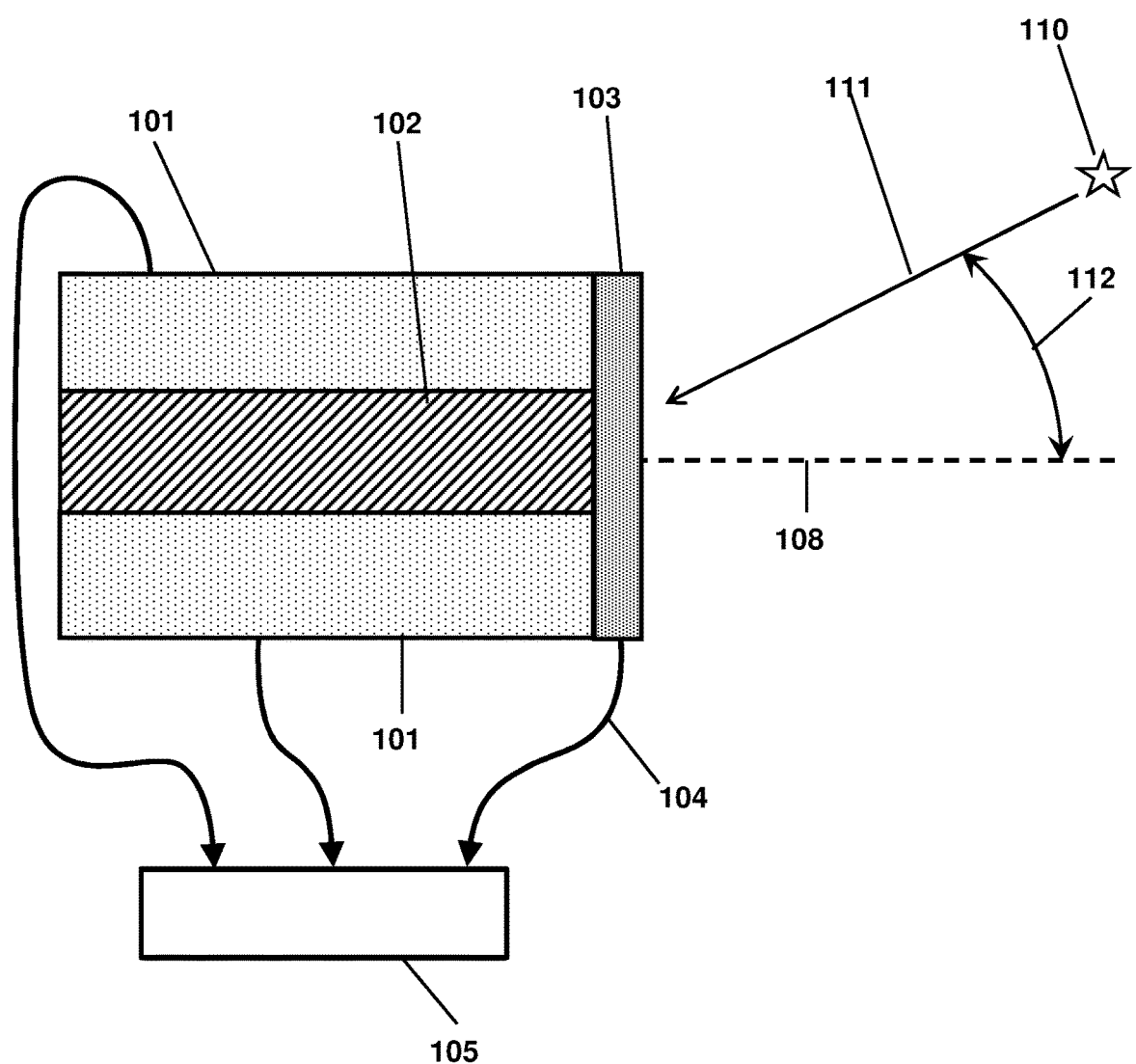
FIG. 1 is a sketch in cross-section of an exemplary device according to the disclosure comprising two side scintillators, one shield, an orthogonal front scintillator, and a processor according to some embodiments.

In the following description, reference is made to the accompanying drawings in which it is shown by way of illustration specific embodiments in which the invention can be practiced. Not all of the described components are necessarily drawn to scale in order to emphasize certain features and to better facilitate the reader's conception of the disclosed embodiments. It is to be understood that other embodiments can be used and structural changes can be made without departing from the scope of the embodiments of disclosed herein.

Disclosed herein is a directional radiation detector device (the "device") for localizing clandestine nuclear weapons and other radioactive sources. In some embodiments, the device may be configured to detect gamma rays or neutrons or both (the "particles") from a radioactive source, and may indicate the angle of the source relative to the device, including the sign and magnitude of the angle (the "source angle"), thereby locating the source in one dimension such as the horizontal dimension. Embodiments of the device can determine the source angle from detection data acquired at a single orientation of the device, with high detection efficiency and superior angular resolution. For rapid localization of clandestine radioactive threats, the directional particle detection device is an enabling improvement.

In some embodiments, the device may comprise a shielding barrier (herein the "shield"), flanked by two parallel slab-shaped detectors (the "side detectors"), with a third slab-shaped detector (the "front detector") positioned orthogonally in front of the device, and an electronic processor configured to analyze the particle detections and determine the source angle, including the sign and magnitude of the angle of the source relative to the device. The shield may be configured as a slab of material, positioned parallel to an "aiming plane" comprising a plane extending from the back to the front of the device. The shield may be configured to block most (over 50%) of the particles that strike it orthogonally. The "midplane" is a plane passing through the center of the device, and orthogonal to the aiming plane, and orthogonal to the front detector; thus the aiming plane, the midplane, and the front detector are all mutually perpendicular. The side detectors and the front detector (collectively "the detectors") may be substantially planar slabs configured to emit a signal upon detecting the particles, or more specifically to emit an electrical or optical pulsed signal when traversed or partially traversed by an energetic electron or ion subsequent to an interaction by a source-emitted neutron or gamma ray. For example, the detectors may comprise scintillator type detectors, or semiconductor detectors such as reverse-biased diodes, or gaseous ionization detectors such as Geiger or proportional chambers. The detector pulse may comprise a light pulse for scintillator type detectors, or a charge or current pulse for semiconductor or gaseous ionization type detectors. Each detector may include, or be connected to, a sensor comprising a transducer configured to convert the raw detector pulses into electronic signals that the processor can analyze. For example, if a detector is a scintillator, the sensor may be a light sensor such as a photomultiplier tube or a photodiode, and if the detector is a semiconductor or gaseous ionization type of detector, the sensor may be an amplifier along with other electronics.

In some embodiments, the two side detectors may be mounted parallel to and closely proximate to the shield, on opposite sides of the shield respectively. The shield and the side detectors may be beveled or shaped in various ways. The front detector may be oriented perpendicular to the aiming plane and perpendicular to the shield and perpendicular to the side detectors and perpendicular to the midplane. The detectors may be configured to produce distinct signals, such as signals on separate conductors or signals having different pulse shapes, so that the processor can determine which signal is associated with which detector. The processor may comprise digital electronics, and optionally analog electronics, configured to analyze signals from the detectors or their associated sensors, and thereby calculate the source angle from the signals. The analysis may include using a predetermined angular correlation function that relates the source angle to the signals from the various detectors.

In some embodiments, the device may have one-dimensional directionality, in that it can determine one vectorial component of the source location relative to the aiming plane. The source angle may comprise the angle between the aiming plane and a vector that extends from the device to the source location. The device may determine the full sign and magnitude of the source angle from data acquired at a single device orientation, without rotating or moving the device. The device may be configured to calculate the source angle by inserting detection data, such as particle counting rates, into a formula that correlates the source angle to the detection data. The detectors may all have different angular sensitivities, and the formula may be configured to determine the source angle according to the contrasting angular sensitivities of the various detectors. In many applications, the horizontal angle of the source is to be determined, in which case the device may be oriented to measure the horizontal angle of the source. In other applications, the vertical angle of the source is to be determined, in which case the device may be reoriented (specifically, rolled) by 90 degrees to measure the vertical angle of the source.

In some applications, the initial determination of the source angle from a single initial orientation of the device is sufficient to localize the source, because the measurement can provide the full source angle including sign and magnitude relative to the aiming plane. In other applications, the device may be required to finally aim directly at the source, in which case the device can first determine the source angle from an initial orientation, and then can be rotated according to the calculated angle, thereby pointing toward the source. Embodiments of the present device can be brought into alignment with the source in a single rotation by the calculated source angle, without searching or iteration. In addition, embodiments can directly detect when the aiming plane is aligned with the source by determining that the side detectors have nearly the same counting rate.

FIG. 1 is a cross-section sketch of an embodiment of the device including two side detectors 101 (shown in light stipple), a shield 102 (in diagonal hatch), a front detector 103 (dark stipple), and a processor 105. The device is pointing to the right in this view, and in all of the sketches unless otherwise specified. Also shown is the aiming plane 108 as a dash line, since it is viewed edge-on in this top view. The midplane is not shown because it lies in the plane of the figure. A source 110 is indicated by a star, and a particle 111 as an arrow. The source angle 112 is indicated as an arc. The side and front detectors 101 and 103 may be configured to emit signals 104 upon detecting the particles 111, and to convey those signals 104 to the processor 105, which may be configured to analyze the signals 104 and calculate the source angle 112. More specifically, the processor 105 may be configured to calculate the difference in counting rates of the side detectors 101, divide by the front detector 103 counting rate, and compare the resulting ratio to a predetermined angular correlation function, thereby determining the source angle 112. In this way the device can determine the specific horizontal location of the source 110, using data acquired at a single orientation of the device.

In an exemplary embodiment, the side detectors 101, front detector 103, and shield 102 may be of any type suitable for the particle 111 being detected. The detectors 101 and 103 may be configured to interact with the particle 111 and thereby generate secondary particles ("secondaries"), such as Compton electrons from gamma ray interactions, or recoil protons from fast neutron scattering, or reaction ions from slow neutron capture. The shield 102 may be sufficiently thick to block or attenuate most of the particles 111 incident orthogonally on the shield 102. Blocking the particle 111 generally means that any radiation passing through the shield 102, such as scattered or secondary particles, must total less energy than a detection criterion. The detection criterion is typically 10% of the energy of the initial particle 111. In some applications, the particles 111 normally arrive from the front, and therefore the particles 111 that strike the shield 102 may encounter a path length of shielding material which is tangentially longer than the thickness of the shield 102. In that case a thinner shield 102 may provide sufficient isolation between the side detectors 101. For example, the shield 102 may be sufficient to block a fraction, such as 10% or 20% or 30%, of the orthogonally incident particles 111.

In an exemplary embodiment, the signals 104 may comprise electrical pulses or optical pulses or other pulses according to the type of detectors 101 and 103 involved. The detectors 101 and 103 may include sensors comprising transducer means for converting one type of signal into another type, such as a photomultiplier or photodiode that converts light pulses into electrical pulses. The processor 105 may comprise digital electronics and optionally analog electronics, and may be configured to analyze the signals 104 and thereby calculate the source angle 112. For example, the processor 105 may include an amplifier or an electronic filter or a pulse-shape discriminator or other analog electronics. The processor 105 may further include a predetermined angular correlation function comprising data stored on non-transient computer-readable media and configured to relate the source angle 112 to detection data of the detectors 101 and 103. The predetermined angular correlation function may comprise any functional or tabular or analytical or graphical data set that relates the source angle 112 to the detection data. The processor 105 may also be configured to apply corrections for backgrounds and/or detector efficiencies to each detector 101 and 103 individually, preferably before the angular analysis is performed.

The processor 105 may be embedded in the device, or mounted proximate to the detectors, or mounted externally and some distance from the detectors. There may be two separate processors, such as an embedded microcontroller in the device and a facility computer elsewhere. In some embodiments, the detectors 101 and 103 include analog electronics such as filters and amplifiers, plus digital electronics such as an embedded microcontroller for pulse shape analysis or other tasks. In other embodiments, the processor 105 may include analog signal-processing electronics as well as digital electronics and logic. The processor 105 may further indicate the calculated source direction using a human-readable display or indicator. The processor may store the results in a non-transitory computer-readable record. The processor may transmit the results to an external computer.

In some embodiments, the front detector 103 may be wide enough to cover the side detectors 101 and the shield 102. Alternatively, the front detector 103 may overhang or extend laterally beyond the side detectors 101 and therefore have higher detection efficiency. As a further alternative, the front detector 103 may be smaller than the array of side detectors 101, thereby allowing a portion of each side detector 101 to be directly exposed to the source 110 when the aiming plane 108 is aligned with the source 110, and thereby increasing the detection efficiency of the side detectors 101. In preferred embodiments, the front detector 103 may have a width-to-thickness ratio of at least 4, where the width is measured perpendicular to the aiming plane 108, and the thickness is measured parallel to the aiming plane 108 in the front-to-back direction. The width-to-thickness ratio of the front detector 103 may determine the angular correlation function from which the source angle 112 is calculated.

In some embodiments, the device can determine whether the source 110 is in front or behind the detector. Since the front detector 103 is positioned frontward of the device, the front detector 103 generally has a higher counting rate when the source 110 is in front of the device, and a lower rate when the source 110 is behind the device. For example, the processor 105 may be configured to calculate the front detector rate divided by the sum of the two side detector rates, and may compare that result to the expected range of values for a source 110 in front versus behind the device, and thereby determine whether the source 110 is in the front or rear halfspace.

In some embodiments, the front detector 103 may partially block the incoming particles 111 from reaching the side detectors 101. The front detector 103 may be configured to pass a fraction, such as 50%, of the incident particles 111 without interacting so that they can be detected in the side detectors 101. In general there are three main possibilities: (1) An incoming particle 111 may pass right through the front detector 103 without interacting, and then be detected in the side detector 101. (2) The incoming particle 111 may interact in the front detector 103 and be stopped or back-scattered or otherwise blocked from reaching the side detector 101. (3) The particle 111 may scatter in the front detector 103 and be detected there, and then the scattered particle or its secondaries may continue in about the same direction and be counted in the side detector 101. For example, an incoming gamma ray can Compton scatter in the front detector 103, and then the scattered gamma ray can be detected in the side detector 101 that it was headed toward. Thus the front detector 103 and one of the side detectors 101 are both triggered at once, in which case the processor 105 may be configured to count both the front and side detector 103 and 101 signals as valid events. As a non-limiting example, the front detector 103 may be made thick enough so that 50% of the incoming particles pass through the front detector 103 without interacting, 25% scatter and are detected in the front detector 103 and then continue on to be detected again in the side detectors 101, and the remaining 25% are detected in the front detector 103 and are absorbed there. Thus the side detectors 101 can view 75% of the particles while the front detector 103 can detect 50% of the incoming particles. This adds up to more than 100% because the events with detections in both the front 103 and side 101 detectors are counted twice.

In the case of neutrons, a fast neutron may pass through the front detector 103 without interacting and then be detected in the side detector 101; or the neutron could scatter in the front detector 103 and then continue on to be detected in the side detector 101; or it could scatter out of the front detector 103 and miss the side detectors 101 entirely. Thus a fast neutron could trigger the front detector 103, or the side detector 101, or both the front and side detectors 103 and 101 at once. Again, events with a pulse in the front and side detectors 103 and 101 may be counted as valid events.

Slow or low-energy neutrons are detected by neutron capture reactions which do not produce a scattered or secondary neutron, and the ions emitted from a neutron capture reaction have extremely short path lengths in matter. Therefore, slow neutron events cannot produce valid counts in both the front detector 103 and the side detector 101 at the same time. To compensate, embodiments for slow neutron detection may be configured with a thinner front detector 103, such as a front detector configured to capture only 33% of the incident slow neutrons, and thereby allow the other 67% to pass through to the side detectors 101.

In some embodiments, the side detectors 101 may cover or substantially enclose the exterior surfaces of the shield 102, except for the edges and a small optional protrusion distance as discussed below. The side detectors 101 may have any thickness that provides sufficient radiation detection efficiency. The best angular resolution may be obtained when the thickness of the side detector 101 is substantially less than its length in the front-back dimension; however, adequate detection efficiency requires that the side detector 101 be as thick as possible. Therefore, the optimal thickness of the side detectors 101 may be a compromise between angular resolution and detection efficiency. Good performance can usually be obtained with a rectangular cross-section side detector 101 of thickness in the range of 0.1 to 0.5 times the length of the side detector 101, although designers may select different side detector geometries for specific purposes. Examples of configurations with different side detector shapes are provided below.

In some embodiments, the processor 105 may be configured to reject events in which both of the side detectors 101 are active at the same time, since these are usually due to cosmic rays. The processor may also reject events in which the detection pulse height is too large since these are also likely due to cosmic rays arriving vertically and passing through an extended region of the detector, resulting in large pulses. For example, a scintillator may have a vertical dimension of typically 5 to 15 cm for a small device. Depending on the cosmic ray angle, the particle may deposit energy throughout a substantial path length of scintillator of at least 3 cm typically. Fast muons drop about 2 MeV per gram/cm$^2$ of material traversed, or at least 6 MeV in 3 cm of plastic scintillator. Most of the gammas from nuclear weapon materials are much lower in energy, typically 1-2 MeV. Therefore, even with the relatively poor energy resolution of plastic scintillators, most of the cosmic rays can be rejected by a threshold cut at 3 MeV.

The side and front detectors 101 and 103 may be selected according to the type of particle 111. As a non-limiting example for detecting gamma rays, the side detectors 101 may comprise low-cost plastic scintillator material, while the front detector 103, being much thinner, may be made from a high-density scintillator such as $CdWO_4$ or BGO, according to some embodiments. Although inorganic scintillators often cost more than plastic, the higher detection efficiency of the denser material may partially compensate for the small volume of the front detector 103, resulting in faster localization of sources. The shield 102 may be lead, or any other preferably high-density, high-Z material, Z being the atomic number.

As a non-limiting example for detecting fast neutrons, the detectors 101 and 103 may comprise plastic scintillators, but preferably with a fluor that discriminates recoil proton tracks from electron tracks, so as to reject gamma ray backgrounds. Alternatively, the side detectors may comprise a hydrogenous transparent material such as acrylic, with ZnS and preferably a wavelength shifter to assist in light collection. As another option, the front and side detectors 103 and 101 may comprise an elpasolite or other ionization-dependent scintillator, configured to emit different pulses according to the ionization density of the charged-particle secondaries, and thereby discriminate between gamma rays and neutrons. The shield 102 for fast neutrons may comprise material with a high hydrogen content such as high-density polyethylene, which moderates fast neutrons by multiple elastic scattering.

As a non-limiting example for detecting slow (thermal or epithermal) neutrons, the front and side detectors 103 and 101 may comprise a hydrogenous material such as borated PVT, or a ZnS-based transparent material loaded with boron or lithium to capture the neutrons. Alternatively, the detectors 101 and 103 may comprise a transparent hydrogenous matrix such as PMMA loaded with microbeads of scintillator containing or proximate to a capture nuclide such as Li or B, preferably enriched in $^{10}B$ or $^6Li$. The microbeads may be sized according to the average path length of the emitted ions which is typically a few microns to a few tens of microns, and the microbeads may be spaced apart by one to a few millimeters so that Compton electrons will usually pass through at most one of the microbeads. In this way the composite microbead scintillator can efficiently detect low energy neutrons while being nearly blind to gamma rays. The shield 102 for thermal neutrons may be HDPE (high-density polyethylene) with LiF added.

As a non-limiting example of an embodiment for detection of 1 MeV gamma rays, the side detectors 101 may comprise PVT plastic with a thickness of 25 mm and length of 80 mm. "Length" refers to the size of the side detectors 101 in a direction going from the back to front of the device. The "height" is measured in the third dimension, perpendicular to the midplane. The height of the side detectors 101 is arbitrary, but 5-20 cm may be a suitable choice for a portable unit. For a fixed-site vehicle scanner, the height may be much larger, up to four meters assuming the signals can be collected efficiently throughout the detector 101. Such a tall detector can scan the entire vehicle or inspection zone at once. The front detector 103 may be a $CdWO_4$ scintillator with dimensions 6 mm thick by 70 mm wide. The front detector 103 is oriented perpendicular to the side detectors 101 and to the shield 102 as shown in the sketch. The shield 102 may be lead, with a thickness of 20 mm and a length of 105 mm for example. That shield provides 66% attenuation of 1 MeV gammas at perpendicular incidence, according to an MCNP6 simulation. The detection threshold in the simulation was set at 100 keV, meaning that a scattered gamma ray would not be detected if it had less than 100 keV of energy.

In some embodiments, the side detectors 101 may comprise spectroscopic type scintillation or semiconductor detectors in which the signal amplitude is proportional to the amount of energy deposited by the incident particle. Preferably the energy uncertainty is at most 10% wherein the energy uncertainty is the full-width-at-half-maximum of the full-energy peak divided by the particle energy. The energy data may identify the source composition, and may also enable source particles 111 to be distinguished from background radiation.

In some embodiments, the processor 105 may be configured to calculate the source angle 112 according to the different and contrasting angular sensitivity distributions of the various detectors 101 and 103. The angular sensitivity of a detector is the detection rate as a function of the source angle 112. The angular sensitivity of the front detector 103 may be determined by the shape and perpendicular orientation of the front detector 103, whereas the angular sensitivities of the side detectors 101 may be determined by the shield 102 since it admits particles from only one side. Each side detector 101 may thus have a strongly antisymmetric angular sensitivity, while the front detector 103 may have a symmetrical angular sensitivity, relative to the aiming plane 108. Exploiting that difference, a unique angular correlation function can be prepared, relating the source angle 112 to the detection rates. Each source angle 112 may correspond to a unique ratio of counting rates in the detectors, and therefore the source angle 112 can be determined from an appropriate analysis of the detection rates at a single orientation, without the need for iteration or rotations. In this way the device can greatly speed up the source detection and localization process by determining the sign and magnitude of the source angle 112 simultaneously and automatically, at any orientation of the device.

Figure 2:
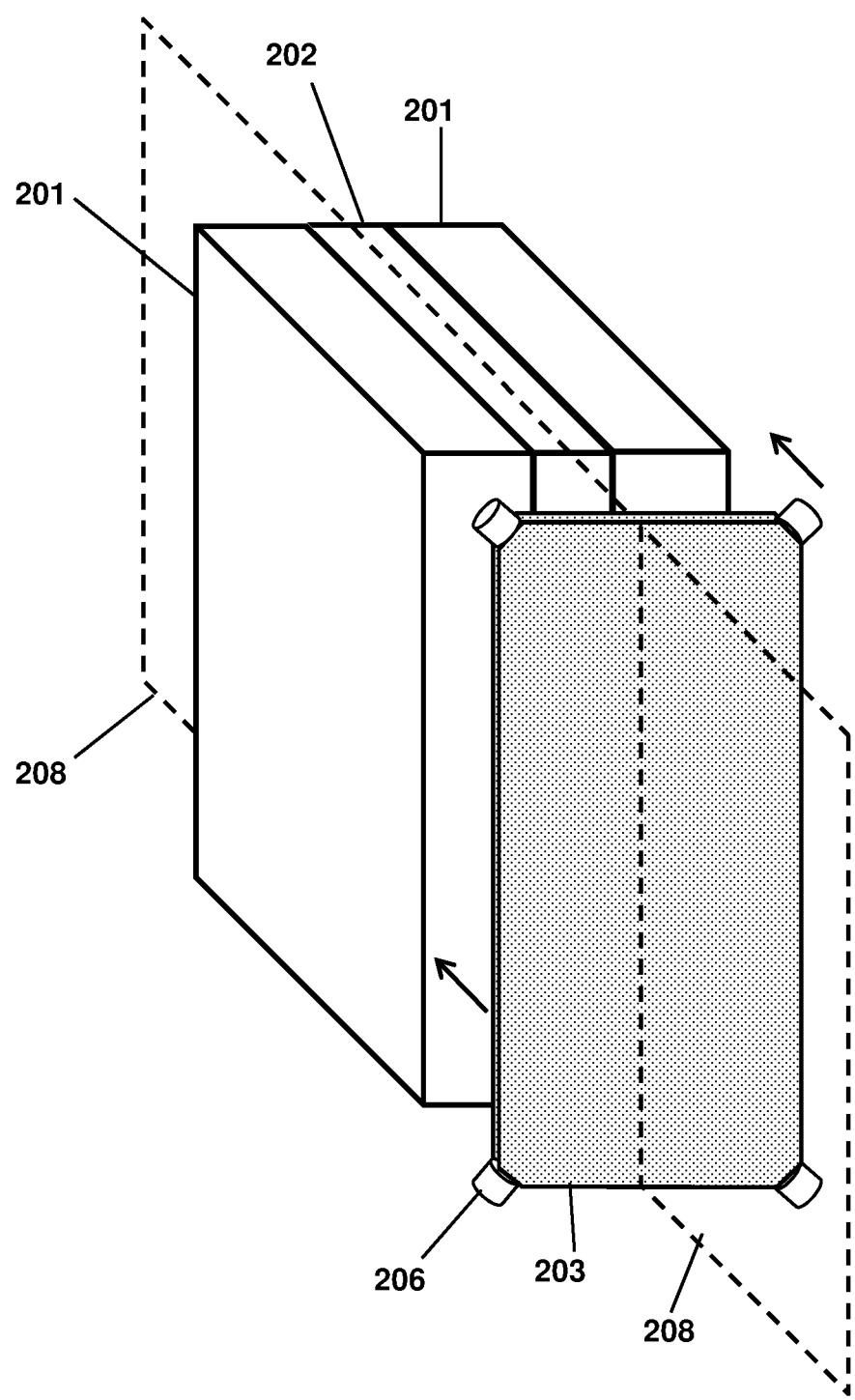
FIG. 2 is a perspective sketch, partially exploded, of the device of FIG. 1, pointing toward the viewer, according to some embodiments.

FIG. 2 is a perspective sketch, partially exploded, of the embodiment of FIG. 1. The device is pointing toward the viewer's right side and out of the page. The device may comprise two side detectors 201 mounted outside and proximate to the shield 202, and a front detector 203 mounted across the front of the device and perpendicular to the shield 202. The aiming plane 208, shown in dash, is the plane of symmetry of the device, passing through the center of the device, and parallel to the shield 202, and parallel to the side detectors 201. The front detector 203 may be oriented perpendicular to the aiming plane 208, perpendicular to the shield 202, and perpendicular to the side detectors 201. In one embodiment, four small sensors 206, such as photodiodes or amplifiers, may be mounted on the corners of the front detector 203.

Figure 3:
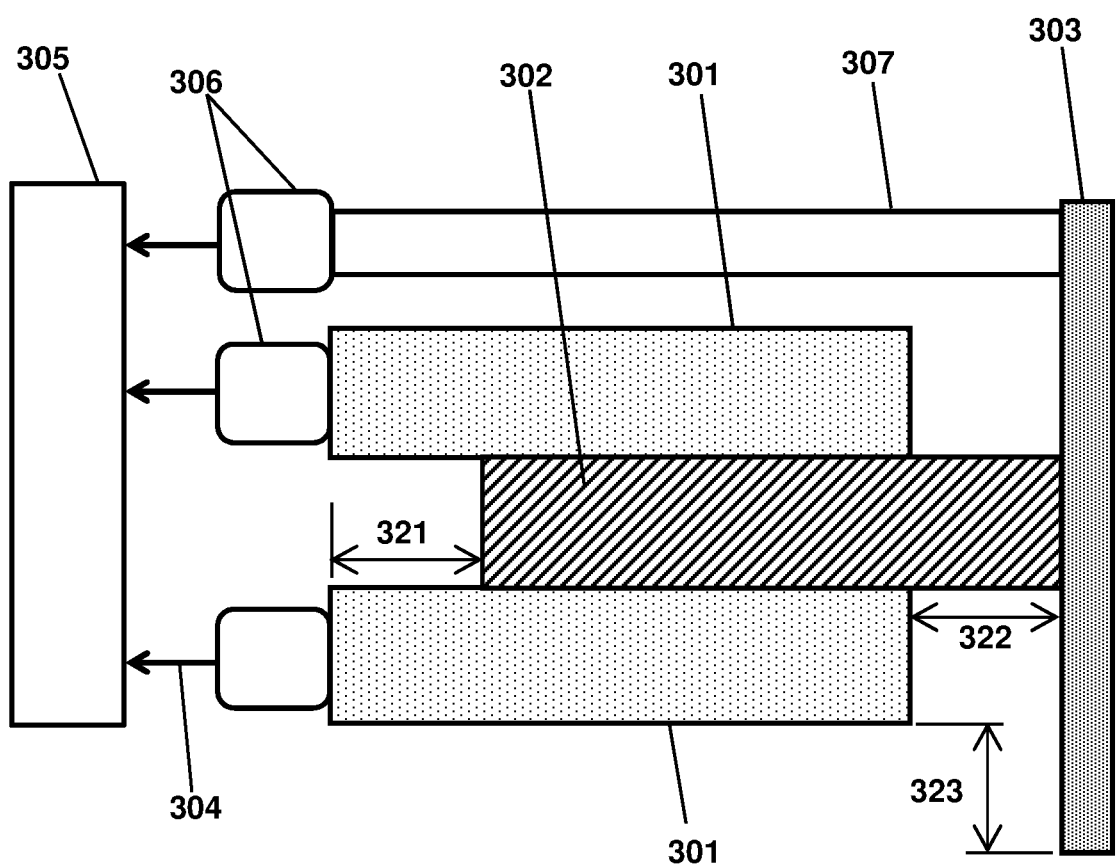
FIG. 3 is a cross-section sketch of an exemplary device, including shield protrusion, shield truncation, and front detector overhang, according to some embodiments.

FIG. 3 is a cross-section view of an exemplary embodiment of the device, with improvements. In the sketch, two side detectors 301 flank the shield 302, with the front detector 303 in front of the device. The detectors 301 and 303 are scintillators in this case. Light sensors 306 view the side detectors 301 and a light guide 307, which is coupled to the front detector 303. Signals 304 are passed to a processor 305 for analysis. Each detector 301 and 303 may be viewed by a different light sensor 306, thereby assuring that the signals 304 from each detector 301 or 303 are distinct and that each particle event can be correctly associated with the detector 301 or 303 in which the interaction occurred.

In some embodiments, the shield 302 may be truncated, or cut short, at the back of the device to save weight. For particles that arrive from the front half-space, the back portion of the shield 302 generally has very little effect, because a particle arriving from the front is very unlikely to pass through one of the side detectors 301, and pass behind the shield 302, and finally interact in the other side detector 301. This might occasionally occur if the source angle is close to 90 degrees, but in that case the two side detectors 301 exhibit such different counting rates that there is no ambiguity about which side the source is on. The truncation distance 321 is the distance from the back end of the shield 302 to the back end of the side detectors 301. Preferably the truncation distance 321 is large enough to save significant weight, but not so large that excessive particle crossover occurs. In some embodiments, the truncation distance may be 1 to 3 times the shield thickness.

In some embodiments, the side detectors 301 may be shorter than the shield 302, so that the shield 302 may protrude frontward beyond the side detectors 301 by a protrusion distance 322. In some embodiments, the protrusion distance 322 may be related to the side detector thickness, such as 0.5 to 1.5 times the side detector thickness, and may be substantially equal to the side detector thickness. The shield 302 may comprise a unitary and uniform slab of material including any protruding portion, such as a simple lead plate, in which case the entire shielding body may be referred to as the "shield". Alternatively, the protruding portion may comprise a different material from the rest of the shield 302, such as a steel shield with a tungsten protrusion. In some embodiments, both of the shield regions may be thick enough to block over 50% of the orthogonally incident particles, or other fraction as required in the application. The purpose of the shield protrusion region is to enhance the angular resolution obtainable from the side detectors 301, by blocking any particles that arrive at an oblique angle, thereby preventing them from striking the downstream detector.

The front detector 303 is shown frontward of the protruding shield 302, and therefore spaced forward relative to the side detectors 301 by a distance substantially equal to the shield protrusion distance 322. The front detector 303 is also shown laterally wider than the rest of the detector, or more specifically extending laterally beyond the side detectors 301 by an overhang distance 323. The overhang 323 may result in larger area and therefore higher detection rates in the front detector 303, and may also improve the angular sensitivity of the front detector 303. The light sensors 306 may be small (25 mm) photomultiplier tubes or photodiode light sensors or other transducers that provide a fast, low-noise, high-sensitivity electrical pulse for each light pulse. The light sensors 306 may include analog signal processing electronics such as amplifiers, filters, discriminators and the like.

In this non-limiting example, the side detectors 301 may be 25 mm thick, the protrusion distance 322 may be equal to the side detector thickness of 25 mm, the shield 302 may be 20 mm thick, the truncation distance 321 may be twice the shield thickness or 40 mm, and the overhang distance 323 may be 10 mm.

In some embodiments, the side detectors 301 and front detector 303 may have strongly contrasting angular sensitivity distributions. The shield 302 may determine the angular response of the side detectors 301 because the shield 302 allows the particles to reach each side detector 301 from only one side, thereby creating a strongly antisymmetric component to the angular sensitivity distribution of each side detector 301, with the two side detector 301 angular distributions being substantially opposite to each other. The front detector 303, on the other hand, may be symmetrically positioned, and therefore may have a symmetric angular sensitivity pattern. The angular correlation function may exploit the difference between the symmetric and antisymmetric angular sensitivity patterns of the side detectors 301 and the front detector 303, thereby enabling a precise determination of the source angle from a single orientation of the device.

In some embodiments, the sign of the source angle, when calculated by the angular correlation method, may equal the sign of the difference between the counting rates of the two side detectors 301, while the magnitude of the source angle may be related monotonically to the ratio of that difference divided by the front detector 303 counting rate. Together, the sign and magnitude determine the full source angle uniquely, in one dimension, relative to the aiming plane.

Operationally, at the beginning of a scan, the device can start out at some initial orientation which may be in the center of an inspection zone, or at the center of the range of rotation of the device, or centered on a suspicious item, or otherwise pre-planned, or random. The device can then acquire particle detection rate data from all the detectors 301 and 303 at that initial orientation, and can then calculate the implied source angle using a predetermined angular correlation function. The angular correlation function may be stored on a computer and may be read by the processor 305. The angular correlation function may comprise discrete values such as a table, each value being the source angle that corresponds to each ratio value, or vice-versa. The discrete values of the angular correlation table can be linearly interpolated whenever an intermediate value is needed between the table entries. Alternatively, the angular correlation information can be stored as a mathematical function or a computer program or other algorithm that takes as input the detector data, and produces as output the best-fit source angle, in which case interpolation may not be necessary. In embodiments, the device can determine the sign of the source angle according to the sign of the difference between the counting rates of the two side detectors 301. The device can then determine the magnitude of the source angle from the counting rate in the front detector 303, by use of the predetermined angular correlation function. The ability of the device to calculate both the sign and magnitude of the source angle, from data acquired at a single orientation, is extremely valuable. With knowledge of the full angle toward the source, the device can provide much better localization results and faster convergence than possible with a simple left-or-right indication.

Figure 4:
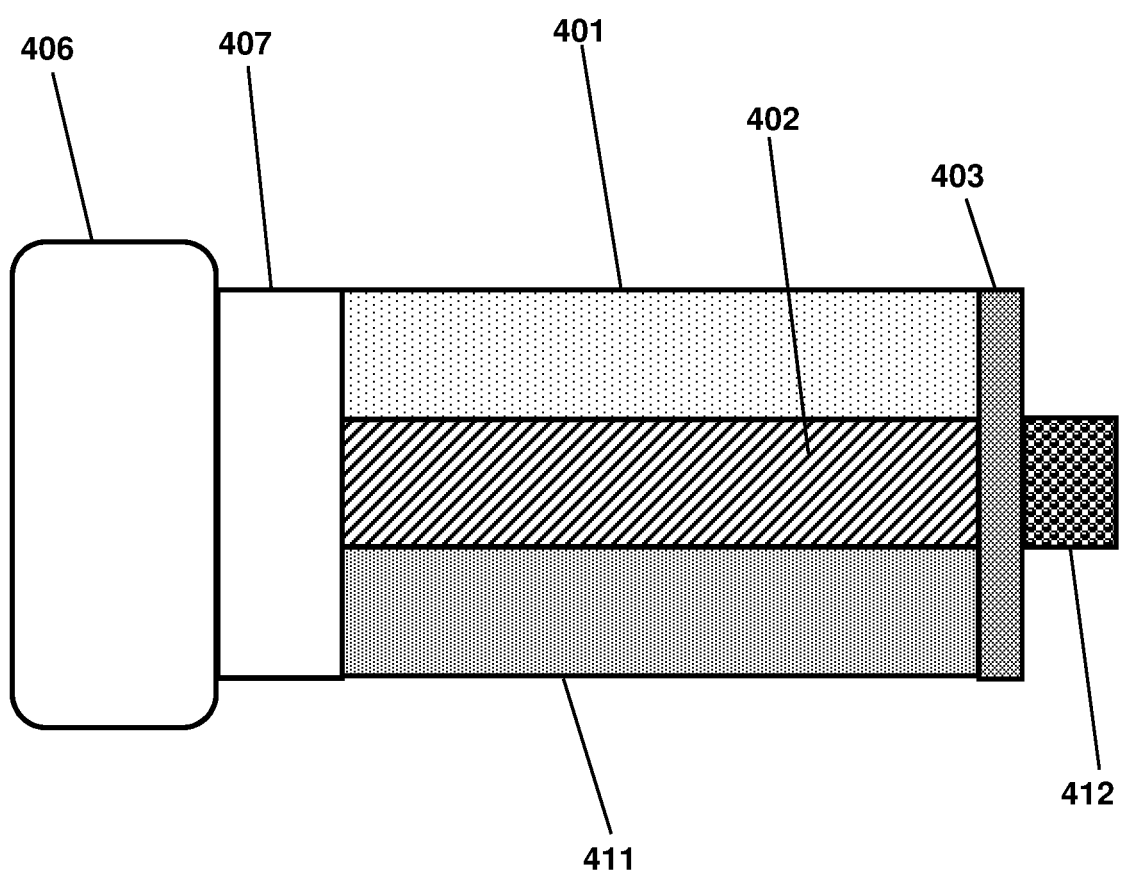
FIG. 4 is a cross-section sketch of an exemplary device with three scintillators of different types, all coupled to a common light sensor, according to some embodiments.

FIG. 4 is a cross-section sketch of an exemplary embodiment of the device in which the two side detectors 401 and 411 comprise two different scintillator materials emitting detectably different light pulse shapes while a light sensor 406 views both of the side detectors 401. For detecting gamma rays, the first side detector 401 may be PVT and the other side detector 411 may be BGO, which have pulse decay times of 5 ns and 300 ns respectively. The front detector 403 may comprise yet a third material with a distinct pulse shape, such as $CdWO_4$ with about 14 microsecond decay time. In addition, the front detector 403 may be optically coupled to the two side detectors 401 and 411, which may be optically coupled to a light guide 407, which may be coupled to a light sensor 406. The detectors 401, 403, and 411, may all be viewed by a single light sensor 406. The device can separate the various pulses according to their distinct shape for each scintillator type, and thereby determine which detector 401, 411, and 403 detected the particle. The depicted configuration may be economical since only one light sensor 406 may be needed.

Also shown is a shield slug 412 comprising material configured to block or attenuate a fraction, such as at least 50%, of the particles incident on it, and positioned frontward of the front detector 403 and centered on the shield 402. The shield slug 412 may comprise a solid in the shape of a right prism, preferably without apertures or perforations, to ensure maximum attenuation of any incident particles. In one embodiment, the shield slug 412 may be shaped as if it were an extension of the shield 402, that is, a rectangular prism with the same thickness as the shield 402. The shield slug 412 may thereby act in the same way as a shield protrusion, by blocking any particles that arrive at an oblique angle, thereby preventing them from reaching the downstream side detector 401. The shield slug 412 may thereby sharpen the angular resolution of the device. The shield slug 412 may comprise the same material as the shield 402, or a different material. In the depicted embodiment, the shield slug 412 may be osmium, while the shield 402 may be lead.

Figure 5:
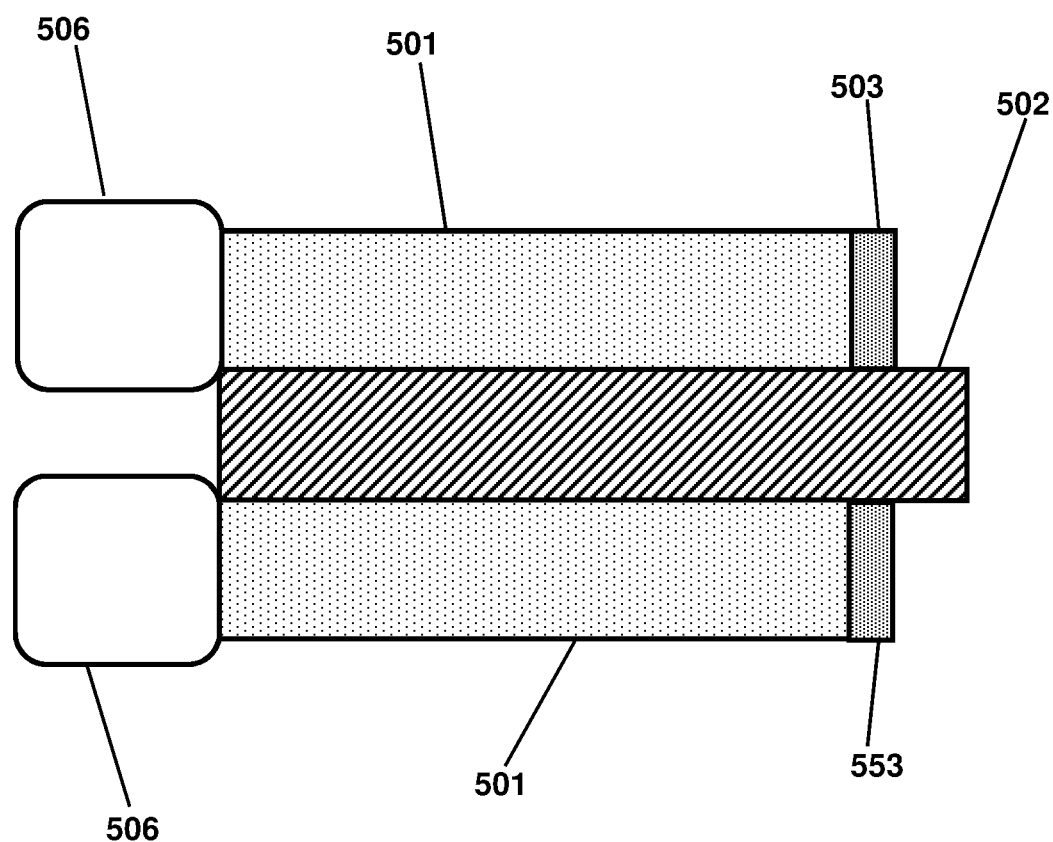
FIG. 5 is a cross-section sketch of an exemplary device with shield protrusion and separate left-front and right-front detectors which are optically coupled to the side detectors, according to some embodiments.

FIG. 5 is an exemplary embodiment with two side detectors 501, a protruding shield 502, and two separate front detectors 503 and 553 which are divided into two portions, each portion being orthogonal to the back-to-front direction. For example, the front detector may be divided into a left front portion 503 and right front portion 553, which may abut at the aiming plane, or they may be separated by, for example, the protrusion of the shield 502 as depicted here. The counting rates of the two portions 503 and 553 may be added together to get a total front detection rate, and the source angle may be determined according to the ratio of the side detector differential to the total front detection rate. Thus the sum of the left and right front detector portions 503 and 553 may act as a single unsplit front detector for determining the source angle.

In some embodiments, the front detector portions 503 and 553 may be read out by separate sensors, and the side detectors 501 may be read out by other sensors, thereby providing separate signals for each of the detectors. Alternatively, the front detector portions 503 and 553 may be coupled to their respective side detectors 501 as shown, and read out by a shared sensor 506. For example, a front left portion 503 may be optically coupled to the left side detector 501, both of which are then viewed by one of the light sensors 506, and likewise for the right side. Preferably the front and side scintillators produce detectably different signals and thus can be separated in analysis. Such a configuration may be economical since it requires fewer sensors 506.

Figure 6:
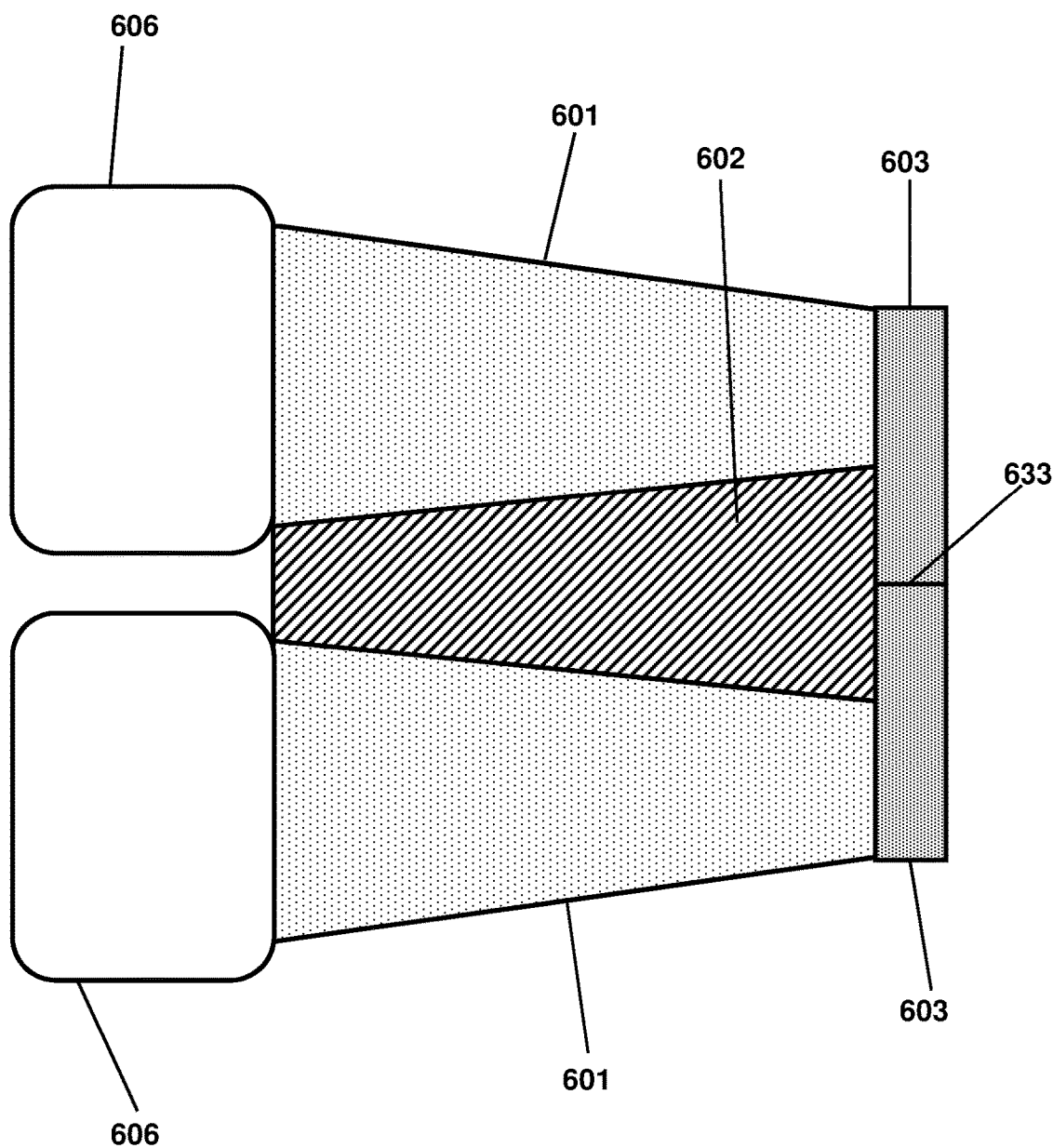
FIG. 6 is a cross-section sketch cross-section of an exemplary device with a tapered shield to reduce weight, and trapezoidal side detectors to augment the detection efficiency, and a split front detector, according to some embodiments.

FIG. 6 shows an exemplary embodiment of the device with a tapered shield 602 and trapezoidal side detectors 601 comprising scintillators. The device is depicted with two front detectors 603, comprising scintillators of a type different from the side detectors 601, and divided at the aiming plane 633 into two sections 603 by foil or other opaque barrier. Each of the front detector sections 603 may be optically coupled to one of the side detectors 601 respectively, and may be viewed by one of the light sensors 606 respectively. The tapered shield 602 may save weight relative to a rectangular shield, since less shielding material may be needed at the back end. Particles arriving from the front half-space are unlikely to pass through one of the side detectors 601, and pass through the shield 602, and finally scatter and be detected in the downstream side detector 601. Therefore the shield 602 may advantageously be tapered to save weight, while providing high shielding at the front end and relatively less shielding at the back.

In some embodiments, the trapezoidal side detectors 601 may be tailored to fit the shape of the tapered shield 602 as shown, thereby providing additional detection volume. The side detectors 601 may also convey scintillator light from the attached front detector section 603 to the attached light sensor 606. In addition, the shape of the side detectors 601, being expanded toward the light sensor 606, may efficiently guide light toward the light sensor 606, thereby enhancing the light collection from the front detector 603 as well as light generated in the side detector 601.

Figure 7:
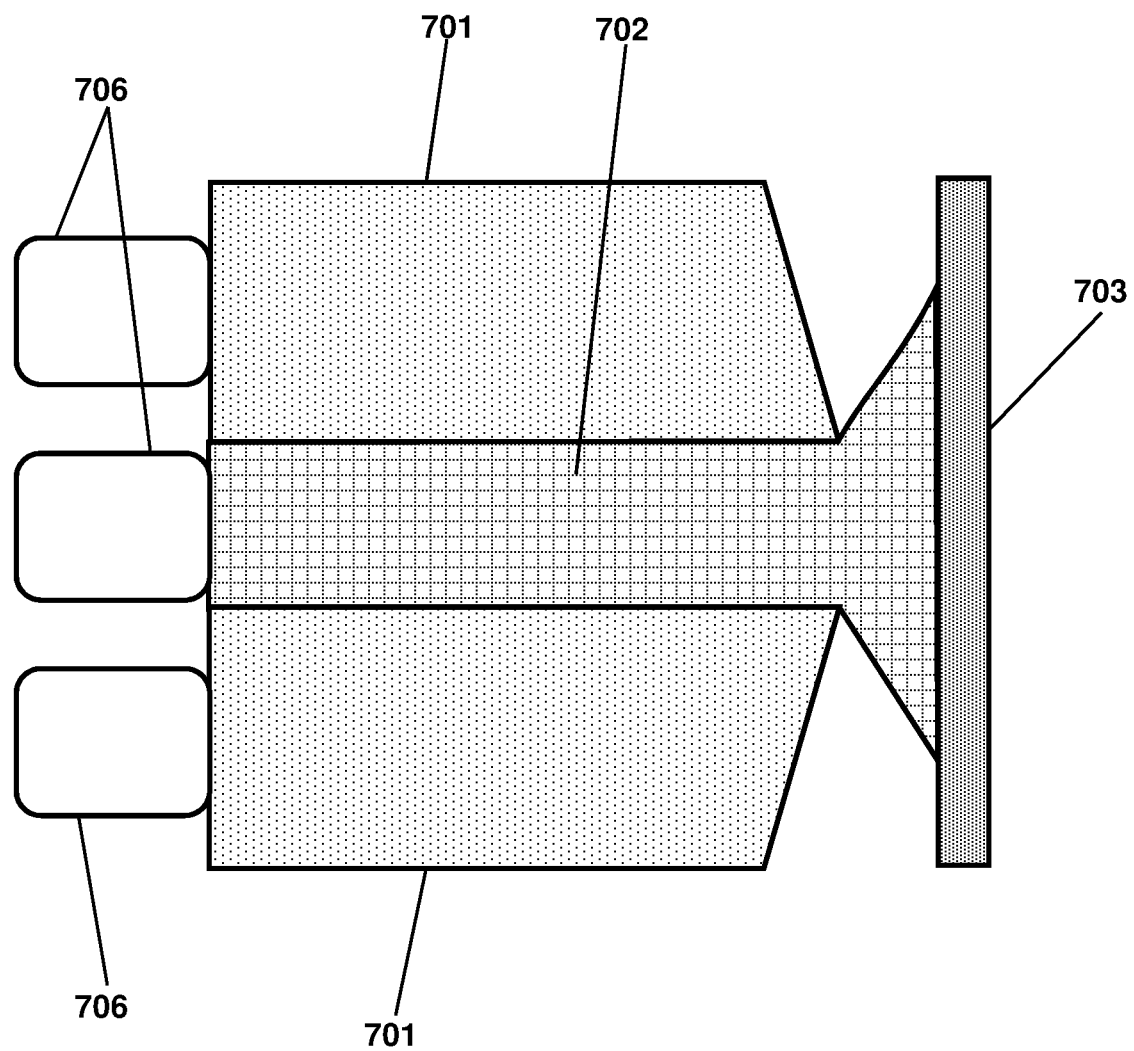
FIG. 7 is a cross-section sketch of an exemplary device with beveled side detectors and a scintillating shield that also acts as a light guide for the front detector, according to some embodiments.

FIG. 7 shows an exemplary embodiment of the device with a transparent shield 702 (shown in grid-hatch) which carries scintillation light from the scintillating front detector 703 to a light sensor 706. The side detectors 701 are beveled at their front edge, so as to sharpen the angular resolution of the device. For example, the side detectors 701 may be beveled on their front edge at an angle of 30 to 60 degrees relative to the aiming plane. The side detectors 701 are shown coupled to separate light sensors 706. The transparent shield 702 is flared or shaped to improve the uniformity of light collection from the front detector 703. Alternatively, the shield 702 may be configured as a simple rectangular plate coupled to the center of the front detector 703, rather than the flared design shown, if the light collection is sufficiently uniform that particles can be detected all the way out to the edges of the front detector 703. The composition of the shield 702 may depend on the type of particle being shielded. For gamma rays, the shield 702 may be leaded glass for example. For neutrons, the shield 702 may be a transparent hydrogenous polymer such as acrylic or carbonate or styrene, optionally with boron or lithium included to absorb scattered neutrons.

Figure 8:
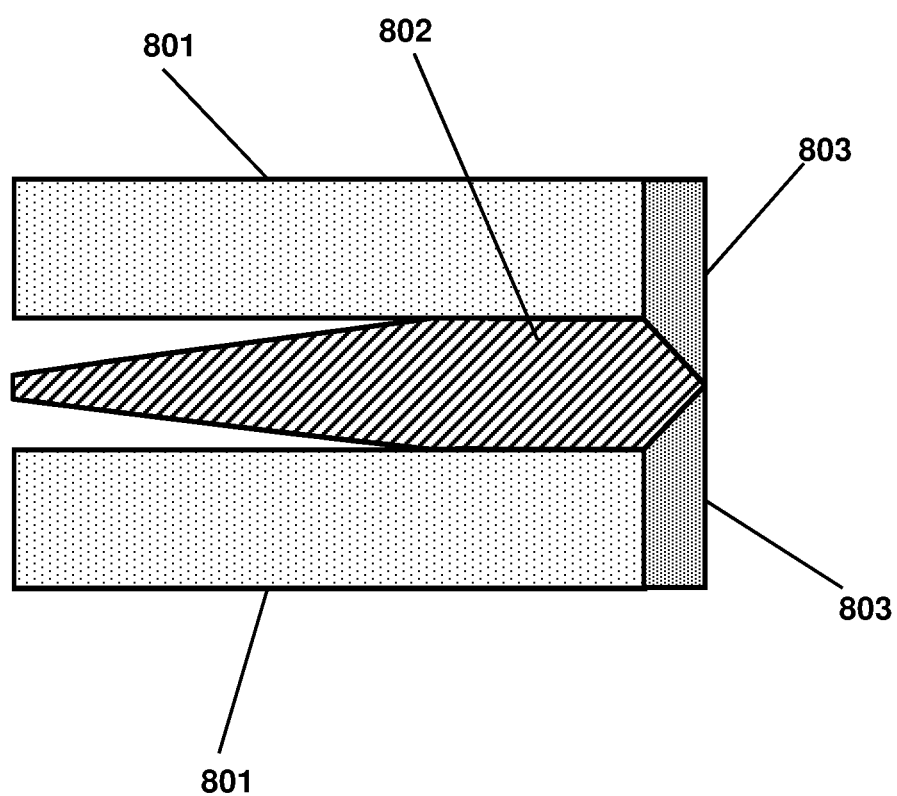
FIG. 8 is a cross-section sketch of an exemplary device with a double-tapered shield and separate front detectors, according to some embodiments.

FIG. 8 is a cross-section sketch of an exemplary embodiment of the device with a tapered and shaped shield 802 that divides the two front detectors 803. Each front detector 803 is a semiconductor detector such as CZT in this example. Two side detectors 801 flank the shield 802. The shape of the shield 802 may provide improved angular resolution due to its frontward peaked shape, and reduced weight due to its tapered back shape.

Figure 9:
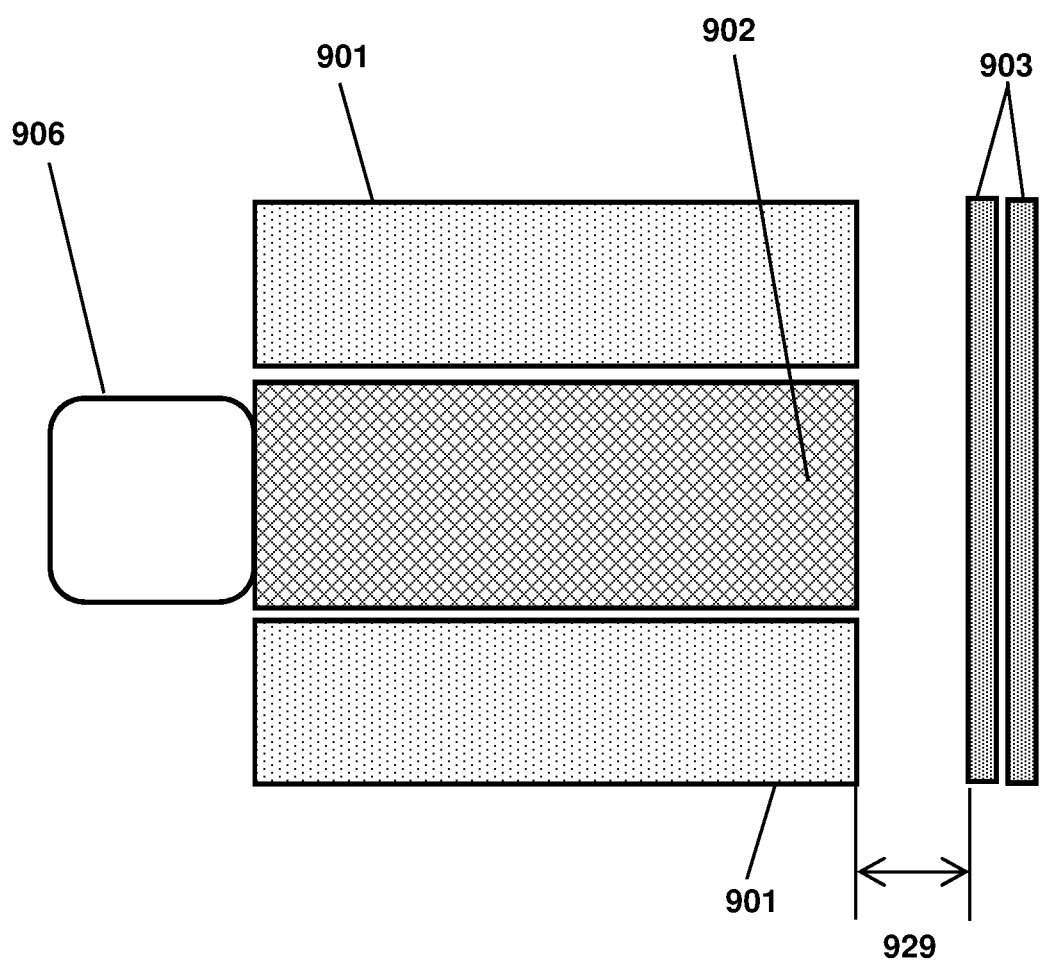
FIG. 9 is a cross-section sketch of an exemplary device with two stacked front detectors, according to some embodiments.

FIG. 9 is a cross-section sketch of an exemplary configuration of the device with two front detectors 903, mounted proximate to each other and parallel to each other in a stack configuration. The front detectors 903 are mounted in front of the device and frontward of the side detectors 901 and orthogonal to the side detectors 901 and orthogonal to the aiming plane. The two front detectors 903 thereby nearly double the detection efficiency of the front detectors 903 while maintaining a very high width-to-thickness ratio for each of the front detectors 903 for enhanced angular resolution. The two front detectors 903 are shown spaced apart from the front of the side detectors 901 by a distance 929. The position of the front detectors 903 may be arranged to tailor the shape of the angular correlation function, or to reduce the amount of the side detectors 901 that are blocked by the front detectors 903 for particles arriving from certain angles. The distance 929 may have any value; for example, the distance 929 may be substantially equal to the thickness of the shield 902 or the side detectors 901.

The shield 902 is depicted as a detector (in cross-hatch) coupled to a sensor 906, and configured to detect particles. Such a detector-shield 902 can thereby provide information about the radiation, which may be different from the information provided by the side detectors 901. For example, the detector-shield 902 may be configured to measure the particle energies more precisely than the other detectors, or to detect a different particle type than the other detectors. In a first version, the detector-shield 902 may be a scintillator or semiconductor viewed by a sensor 906 comprising a phototube or an amplifier. The detector-shield 902 may be configured to provide sufficient shielding, as well as the particle detection function. For detecting and shielding gammas, the detector-shield 902 may comprise a high-density, high-Z scintillator material, such as BGO, LYSO, or $CdWO_4$ and thick enough to provide the necessary isolation between the side detectors 901. For neutrons, the detector-shield 902 which is configured to detect neutrons and to block neutrons, may be ZnS in an acrylic matrix, or a plastic scintillator with an ionization-dependent fluor to discriminate electrons from ions, and loaded with a lithium compound. Such a detector-shield 902 may provide an improved, and non-directional, measure of the ambient radiation level with greater sensitivity than the side detectors alone, which may reveal a well-shielded source that is difficult to detect otherwise.

In a second version, the detector-shield 902 may comprise a spectroscopic detector that produces a signal proportional to the energy deposited in the detector-shield 902, preferably with an energy uncertainty of no more than 10%. For example, NaI or CZT can measure gamma rays with sufficient energy resolution.

In a third version, the detector-shield 902 may be configured to detect the opposite type of particle as the side detectors 901. For example, the side detectors 901 may be configured to detect gamma rays and to not detect neutrons, while the detector-shield 902 may be configured to detect neutrons and to not detect gamma rays. The side detectors may comprise BGO to detect gammas exclusively, and the detector-shield 902 may comprise lead-loaded PMMA with ZnS scintillator layers to detect neutrons exclusively. In that case the source angle can be determined from the side and front detector data 101 and 103, while the detector-shield 902 can indicate whether neutrons are present. Such multi-particle data can be highly advantageous in a threat inspection, wherein the source can be located using the abundant gammas, while the neutron detections can warn the inspector that the source is likely to be much more dangerous than a benign gamma source.

In a fourth version, the detector-shield 902 may be dual-mode, or configured to detect both neutrons and gamma rays, and to discriminate between them by emitting different pulse shapes according to the ionization density of the track. Scintillators such as CsI, ZnS, elpasolite, or certain plastic scintillator fluors with appropriate excitation levels, may provide this discrimination.

In a fifth version, the detector-shield 902 and the side detector 901 and the front detectors 903 may all be dual-mode detectors configured to detect both gammas and neutrons while discriminating between them according to pulse shape. For example, the front and side detectors 901 and 903, and the detector-shield 902, may all comprise elpasolite scintillator. Such detectors can detect and localize a gamma ray source, and can simultaneously detect and localize a neutron source, according to the signal pulse shapes.

In a sixth version, the shield 902 may be just a shield with no detection function, but is adapted to shielding both neutrons and gamma rays, such as lead interleaved with polyethylene. The side detectors 901 and the front detectors 903 may be configured as dual-mode detectors, thereby detecting and localizing gamma sources and neutron sources separately.

Figure 10:
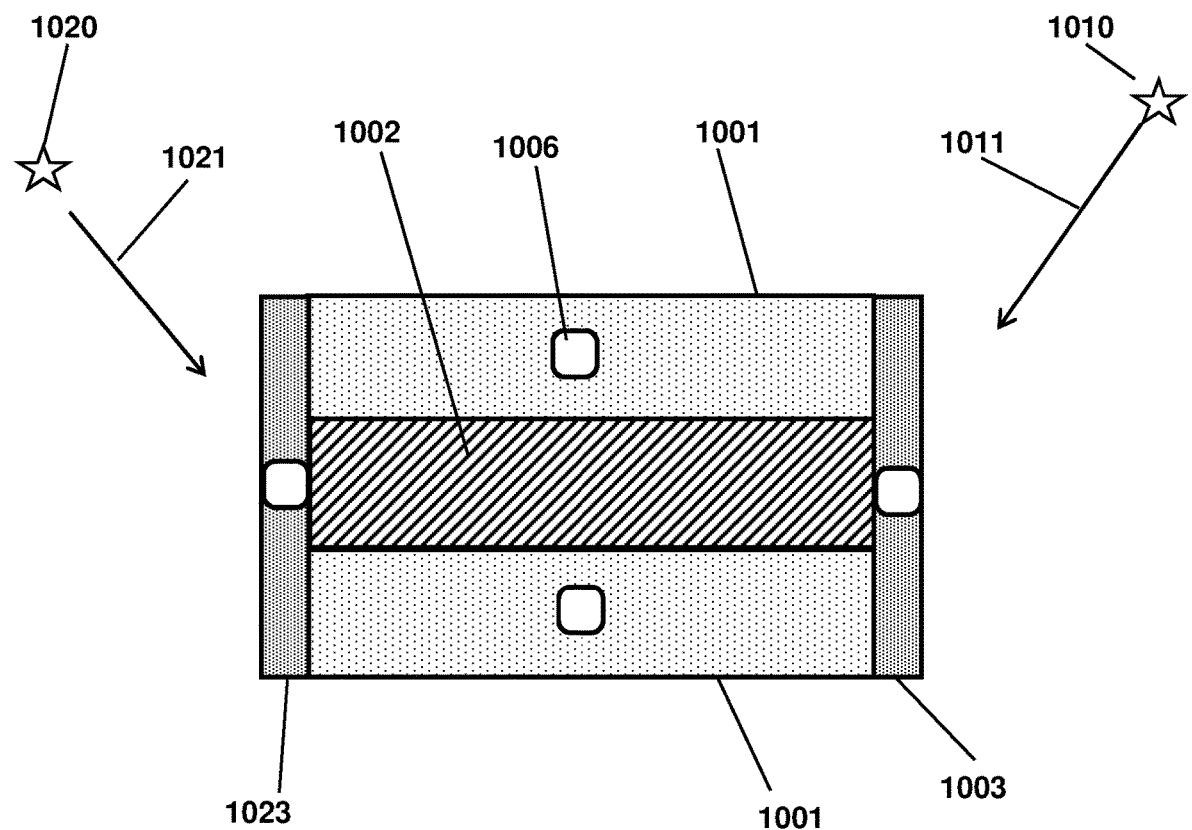
FIG. 10 is a cross-section sketch of an exemplary device including a front detector and a back detector, to measure radiation from all sides at once, according to some embodiments.

FIG. 10 is a top-view cross-section sketch of an exemplary embodiment of the device in a double-sided configuration. The front of the device is at the right of the sketch, and the back of the device is at the left, although the embodiment is symmetric and there is no substantial difference between front and back. Around a shield 1002 are two side detectors 1001, a front detector 1003, and a back detector 1023, with sensors 1006 mounted on the edges (top edges are visible in this top view) of the various detectors. The back detector 1023 may be substantially similar to the front detector 1003 in shape and composition, but mounted on the back surface of the device rearward of the side detectors 1001 and parallel to the front detector 1003. Both the front and back detectors 1003 and 1023 are perpendicular to the shield 1002 and perpendicular to the side detectors 1001. By comparing the detection rates of the front and back detectors 1003 and 1023, the device can determine the position of the source in front or behind the device.

The sketch shows one source 1010 in front of the device emitting a particle 1011 toward the front detector 1003, and an alternative source 1020 emitting a second particle 1021 toward the back detector 1023. The device can determine whether a source is in front or behind the device by comparing counting rates in the front and back detectors 1003 and 1023. The device can then determine the source angle by subtracting data associated with one of the side detectors 1001 from the other side detector 1001 data, thereby obtaining a differential, and then dividing the differential by data from whichever of the front and back detectors 1003 or 1023 has the higher counting rate, thereby obtaining a ratio, and then comparing the ratio to a predetermined angular correlation function to determine the source angle. As a practical matter, the angular correlation functions of the front and back scintillators 1003 and 1023 might be somewhat different due to variations in material properties or fabrication. Therefore, a separate angular correlation function may be measured experimentally and employed for each of the front and back detectors 1003 and 1023. The double-sided configuration may be useful when the source could be located anywhere around the device, since with a 360-degree view and high detection efficiency, the device can detect particles from any direction.

Figure 11:
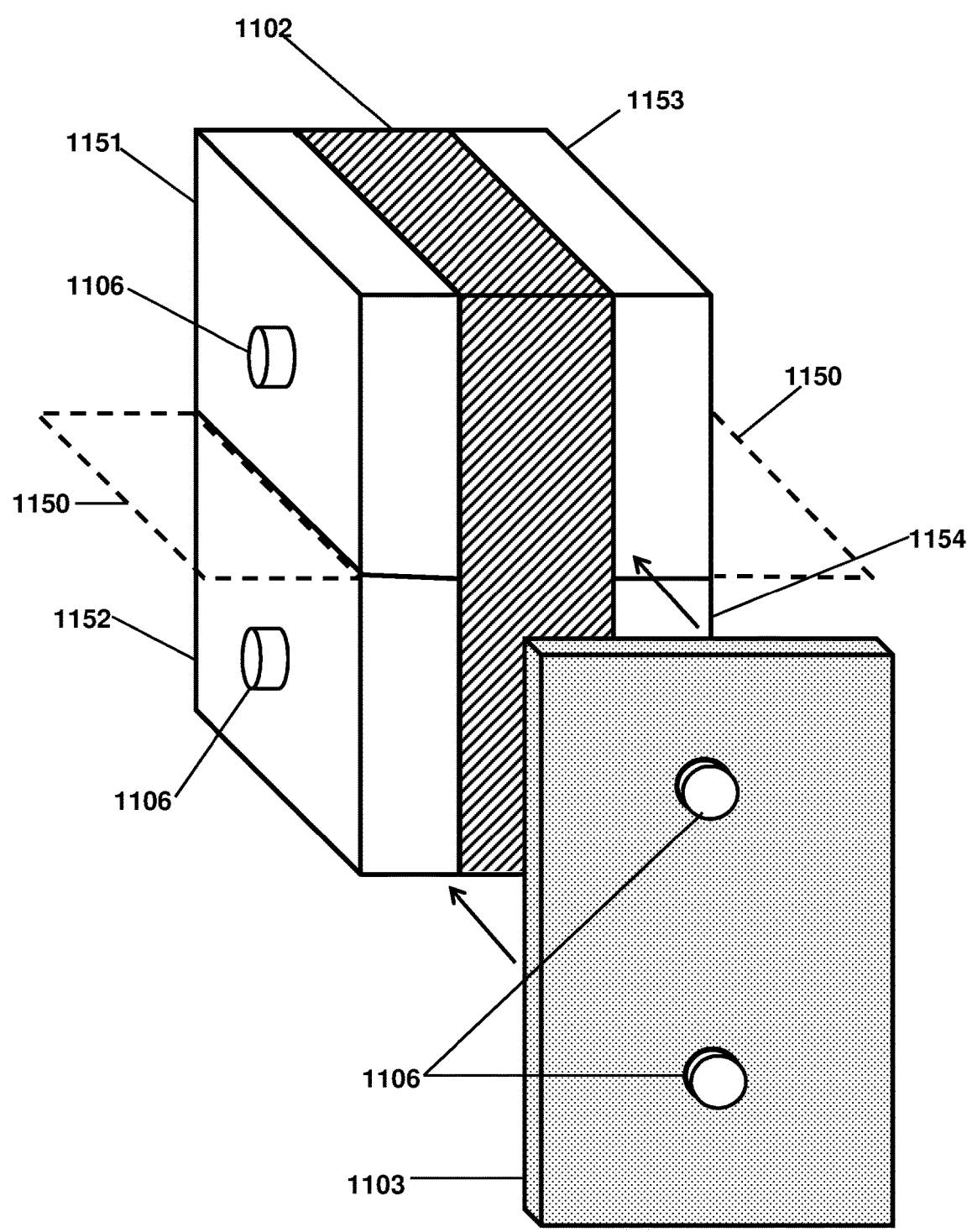
FIG. 11 is a sketch in perspective, partially exploded, of an exemplary device with split side detectors to determine whether the source is above or below the midplane, according to some embodiments.

FIG. 11 shows an exemplary embodiment of the device in perspective, partially exploded, and configured to determine whether the source is above or below or on the midplane. Each side detector is shown split into an upper portion and a lower portion. Specifically, the left side detector may be split into a left-top portion 1151 and a left-bottom portion 1152, while the right side detector may be split into a right-top portion 1153 and a right-bottom portion 1154. The top portions 1151 and 1153 substantially abut the bottom portions 1152 and 1154 at the midplane 1150 (aside from a small allowance for foil and wrapping and the like). The shield 1102 and the front detector 1103 are also shown. Sensors 1106 such as photodiodes or amplifiers are shown attached to the top portions 1151 and the bottom portions 1152 of the side detectors, and also to the front detector 1103.

The device may be configured to determine the vertical source position by comparing signals from the upper portions 1151 and 1153 to the lower portions 1152 and 1154. For example, the device can add the detection rates of the two top portions 1151 and 1153 to get a top sum, and can add the two bottom portions 1152 and 1154 to get a bottom sum, and can then subtract the bottom sum from the top sum to get a vertical differential. The device can also add the rates for all four top and bottom detectors 1151-1154 to get a total detection rate. Then the device can determine the sign of the vertical angle by dividing the vertical differential by the total detection rate, thereby obtaining a vertical ratio, and can compare that vertical ratio to a predetermined vertical angular correlation function which indicates the sign of the vertical angle of the source as being positive or negative, or nearly zero if the source is substantially on the midplane 1150. When the source is above the device, the top portion 1151 or 1153 of each side detector counts more than the corresponding bottom portion 1152 or 1154, and vice-versa when the source is below the device. When the source is on the midplane 1150, the upper sum is substantially equal to the lower sum. In some embodiments, the sign of the vertical angle may be found from the sign of the vertical differential directly, without the step of dividing by the sum of all four detector rates. The device may also determine an uncertainty in the vertical angle determination, according to the statistical uncertainty in the various detector counting rates for example.

The device can also determine the horizontal source angle using the same set of detection data. First the device can add together the detection rates of the top 1151 and bottom 1152 portions of the left side to get a left sum, and can add the top 1153 and bottom 1154 portions of the right side to get a right sum. The device can then subtract the left sum from the right sum to get a horizontal differential, and can divide the horizontal differential by the front detector 1103 detection rate to get a horizontal ratio. The device can then compare the horizontal ratio to a predetermined horizontal angular correlation function that directly indicates the source angle in the horizontal direction, including sign and magnitude. When the device is aimed directly at the source both horizontally and vertically, all four portions 1151-1154 may count at substantially the same rate, within expected statistical variations.

In some embodiments, the left top and bottom portions 1151 and 1152 may be viewed by two different sensors, and likewise for the right portions 1153 and 1154. Alternatively, the top and bottom portions of the left side 1151 and 1152 may be viewed by the same sensor 1106 or sensors, so long as the two portions 1151 and 1152 produce detectably different signals. Likewise the right side portions 1153 and 1154 may be viewed by a single sensor or shared sensors. For example, the left-top portion 1151 may be a standard plastic scintillator with a 5 ns decay time, while the left-bottom portion 1152 may be plastic scintillator with a different fluor that has a 240 ns decay time, and both may be viewed together by a single phototube; and likewise for the right side. Such an arrangement may be economical since half as many sensors 1106 are needed for generating the side detector signals. Preferably the top and bottom portions are configured to have the same detection efficiency or are pre-calibrated to correct for any differences in their detection efficiencies on both sides.

With such side detectors, being split at the midplane, the device can determine a large amount of information about both the horizontal and vertical angles of the source without rotations. (a) The device can determine the sign of the horizontal angle of the source, relative to the aiming plane, according to the sign of the horizontal differential, and it can determine the magnitude of the horizontal angle according to the ratio of the horizontal differential divided by the front detector 1103 rate. And, if the horizontal differential is zero within expected statistical uncertainties, the device can determine that the source is substantially on the aiming plane. (b) Using the same detection data, the device can also determine the sign of the vertical angle (or elevation angle) of the source relative to the midplane, according to the sign of the vertical differential, and can also estimate the magnitude of the vertical angle according to the ratio of the vertical differential to the total sum. And, if the vertical differential is zero, the device can determine that the source is on the midplane. (c) If all four portions have the same detection rate within statistical uncertainties, then the device can determine that it is aimed directly at the source both horizontally and vertically. All of these results may be obtained from detector data acquired at a single orientation of the device without rotations or iterations.

In some embodiments, the shield 1102 may be configured as a particle detector, such as that of FIG. 7, but split into a center-top portion and a center-bottom portion, abutting at the midplane 1150. Then the ratio of the counting rates of the top and bottom detector-shield portions can reveal whether the source is above or below the midplane 1150, or aligned with the midplane 1150 if the counting rates are statistically the same.

In a further embodiment, the top and bottom detector-shield portions may be configured as spectroscopic type detectors that can measure the amount of energy deposited with an uncertainty of less than 10%, thereby providing both particle energy information and source vertical position information simultaneously. This feature may be useful in separating a threat source from low-energy environmental backgrounds.

Figure 12:
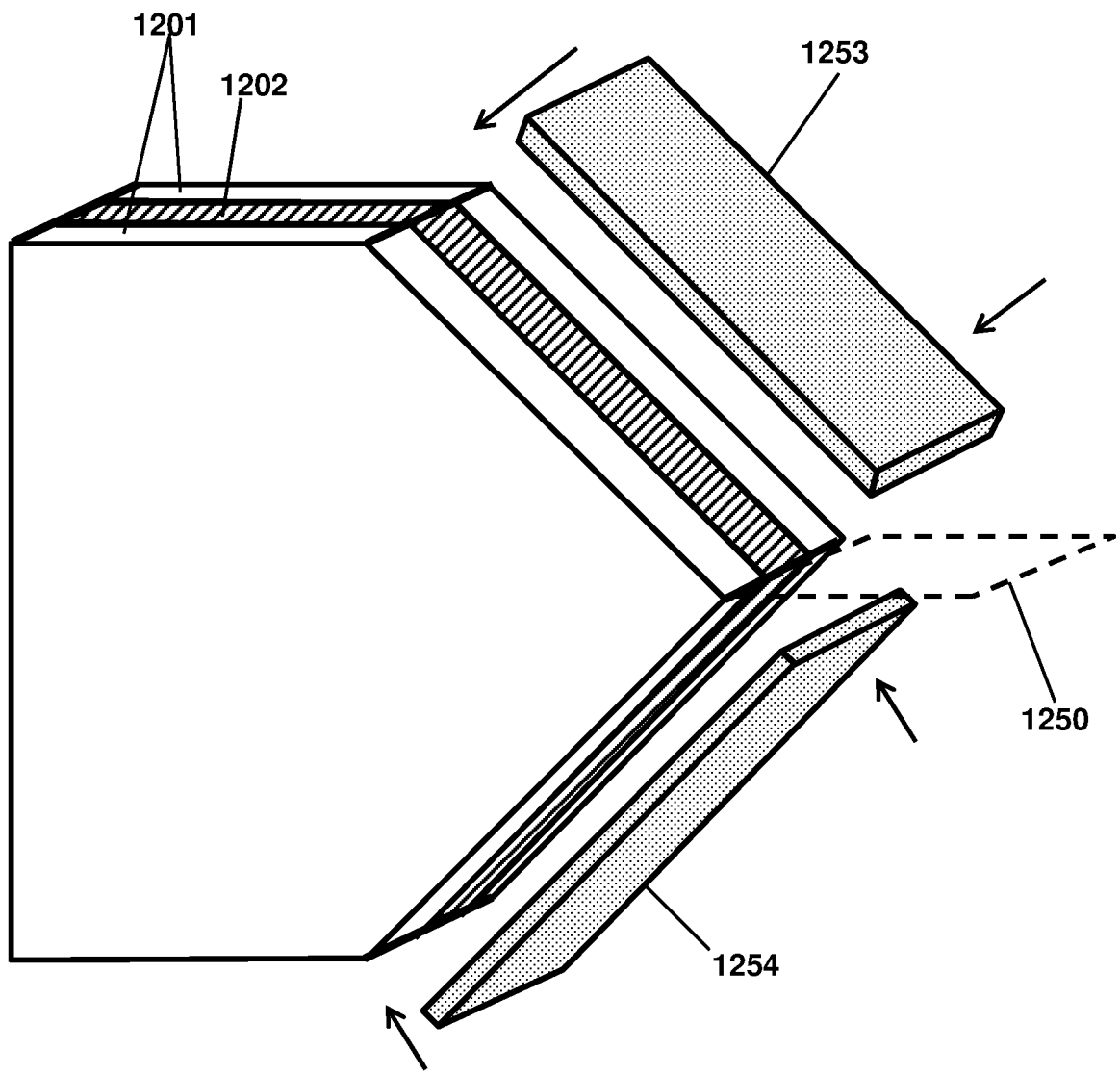
FIG. 12 is a sketch in perspective, partially exploded, of an exemplary device with separate front detectors mounted

FIG. 12 shows an exemplary embodiment of the device in perspective, partially exploded, with the front detector being divided into upper and lower portions. Two side detectors 1201 and a central shield 1202 may be shaped to a frontward point, in this case a 90-degree point, at the midplane 1250. An upper front detector 1253 and a lower front detector 1254 may then be installed across the diagonal surfaces above and below the midplane 1250 respectively. The depicted device can provide a determination of both the horizontal and vertical angles of the source. The horizontal angle may be obtained by adding the counting rates of the upper and lower front detector portion counting rates 1253 and 1254, thereby obtaining a total front counting rate. Then the difference between the two side detector 1201 counting rates may be found by subtraction, and that differential may be divided by the total front counting rate, and the ratio may be compared to a predetermined angular correlation function, thereby obtaining the sign and magnitude of the horizontal angle of the source.

To estimate the vertical source angle, the lower front detector 1254 counting rate may be subtracted from the upper front detector 1253 counting rate to obtain a vertical differential, and the two side detector 1201 rates may be added to get a sum. The device may then divide the vertical differential by the sum to obtain a vertical ratio, which may then be compared to a predetermined vertical angular correlation function. Since the upper and lower front detectors 1253 and 1254 are perpendicular to each other in this design, the difference in their counting rates is a sensitive measure of the vertical source angle. Hence in this embodiment the vertical ratio may provide a measure of the vertical source angle magnitude as well as its sign, and may also indicate that the source is on the midplane 1250 when the upper and lower front portions 1253 and 1254 are substantially equal.

Figure 13:
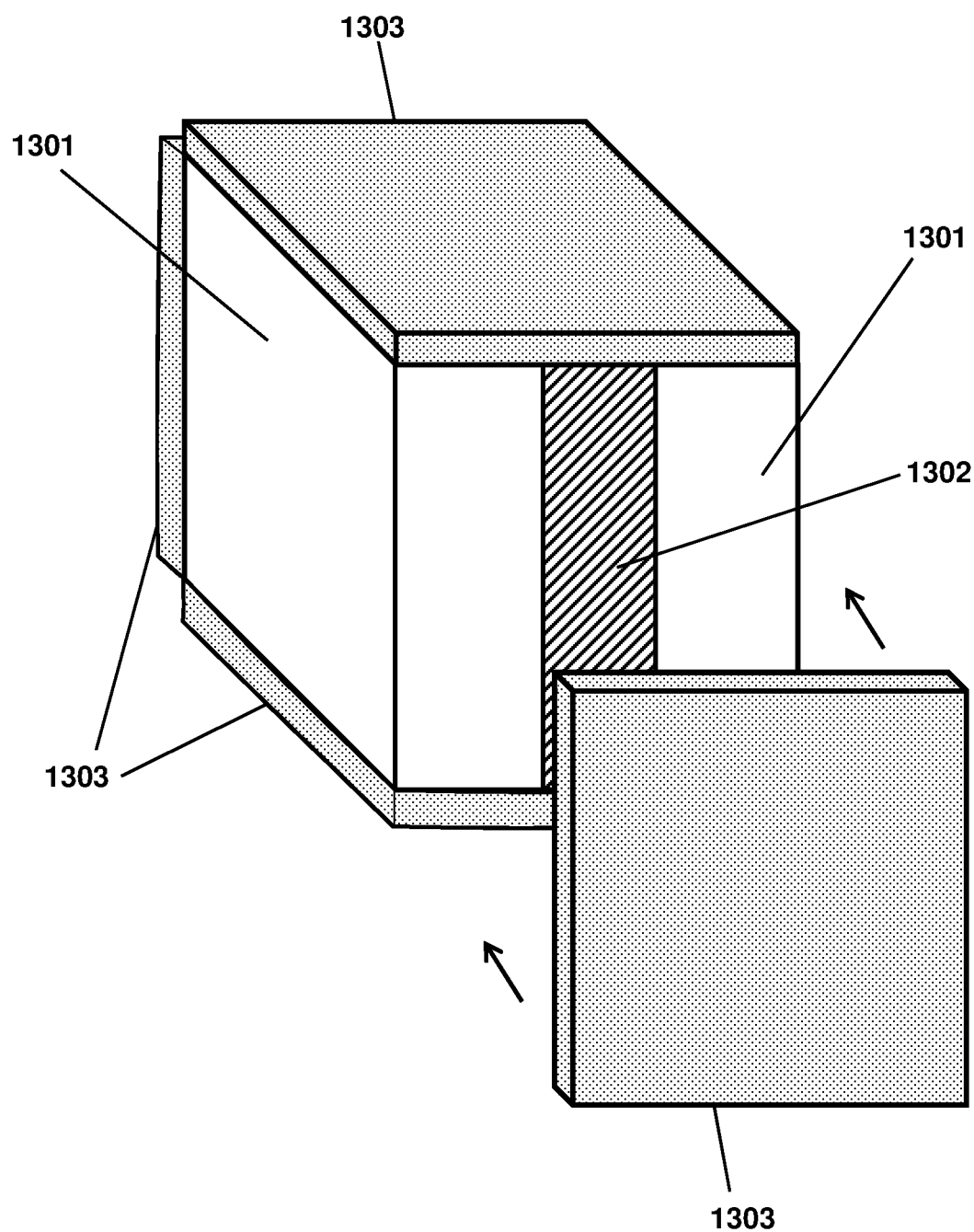
FIG. 13 is a sketch in perspective, partially exploded, of an exemplary device with four orthogonal detectors positioned in front, back, top, and bottom of the device, according to some embodiments.

FIG. 13 shows in perspective, partially exploded, an exemplary configuration of the device as a cuboid sandwich array for omnidirectional detection. The device has four "orthogonal detectors" 1303 perpendicular to the shield 1302 and attached to the front, top, back, and bottom of a cuboid sandwich assembly comprising the shield 1302 and side detectors 1301. The device can determine the source location by comparing or interpolating or otherwise fitting the signals from each of the four orthogonal detectors 1303, thereby determining which has the highest counting rate, and thereby determining whether the source is in front, or behind, or above, or below the device. The device can then determine the source angle according to the particle detection rate of a selected one of the orthogonal detectors 1303 that has the highest particle detection rate.

Alternatively, if the device is turned on its side, it can determine the horizontal angle by comparing the counting rates in the four orthogonal detectors 1303, and also can determine the vertical angle of the source by analyzing the side detectors 1301 divided by one of the orthogonal detectors 1303 according to the angular correlation method.

Figure 14:
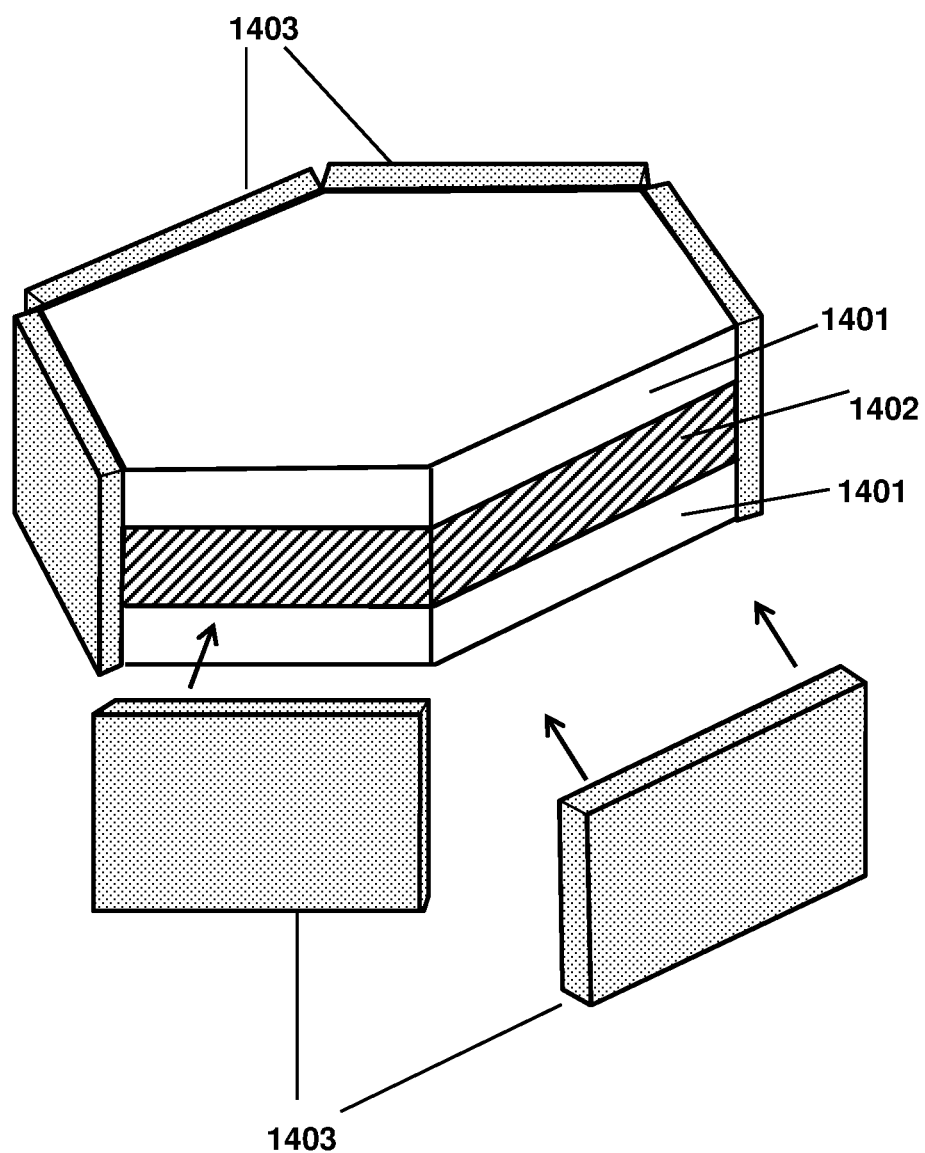
FIG. 14 is a sketch in perspective, partially exploded, of an exemplary device with a horizontal aiming plane and with six orthogonal detectors surrounding the device, according to some embodiments.

FIG. 14 shows an exemplary configuration of the device in perspective, partially exploded, comprising a hexagonal sandwich array surrounded by orthogonal detectors. More specifically, the depicted device includes a hexagonal-shaped shield 1402, two hexagonal side detectors 1401, and six rectangular-shaped orthogonal detectors 1403 which are mounted against the six edge flats of the hexagonal assembly and perpendicular to the shield 1402 and to the side detectors 1401. The device can measure the vertical angle of the source according to the difference between the two side detector 1401 rates divided by the sum of all the orthogonal detector 1403 rates. The device can also determine the approximate horizontal angle of the source according to which of the orthogonal detectors 1403 has the highest and lowest counting rates, or by fitting the orthogonal rates to a source model, or by subtracting each orthogonal detector rate from its opposite orthogonal detector, among other possible analysis means.

Figure 15:
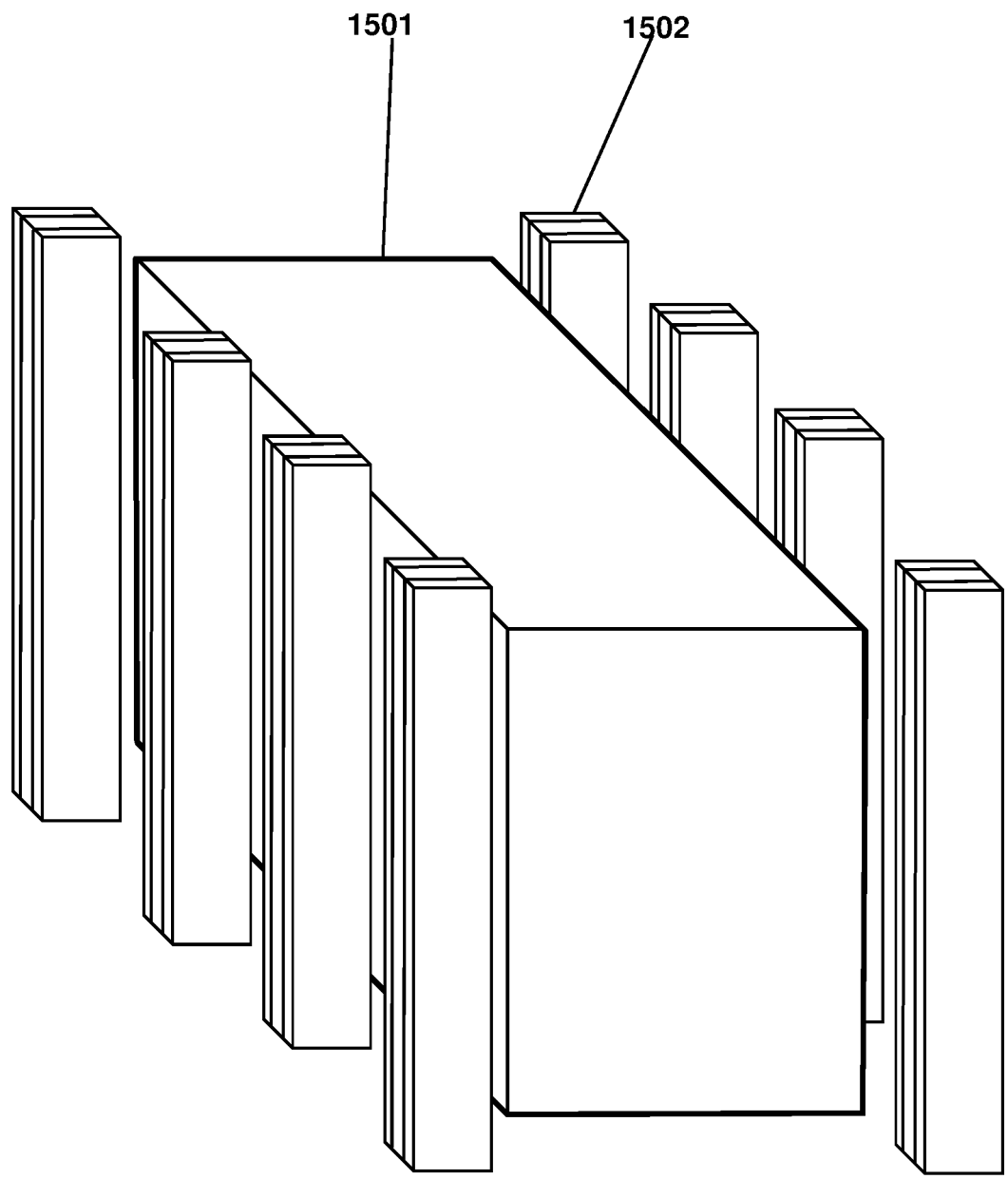
FIG. 15 is a perspective sketch of an exemplary vehicle inspection station incorporating the directional device, according to some embodiments.

FIG. 15 is a perspective sketch of an exemplary vehicle scanner comprising a large number of the directional devices 1502 arrayed around an inspection object such as a truck or shipping container 1501. Each of the devices 1502 may be configured to detect gamma rays or neutrons or both. Each device 1502 may be configured to determine the angle of a source relative to its own aiming plane, thereby localizing the source by triangulation. Alternatively, the devices 1502 may be configured to provide their raw data to a facility computer that determines the most likely location of the source or sources using all the data, for example in a global fit of the data. Such a global analysis may be more sensitive and more accurate than analyzing each device 1502 separately, particularly when the source is faint or well-shielded.

In some embodiments, a fraction of the devices 1502 may be mounted horizontally to measure the elevation angle of the source, while the other devices 1502 may be mounted vertically as shown. Then the data can be used to determine the three-dimensional distribution of radiation sources, using a three-dimensional source model or a 3-D fit for example. This may be useful when the source has thick shields that scatter and redistribute the particles so that it no longer appears as a point source.

In some embodiments, a fraction of the devices 1502 may comprise gamma-blind neutron-sensitive detectors, while others comprise neutron-blind gamma-sensitive detectors, thereby localizing gamma sources and neutron sources separately. Alternately, the devices 1502 may include ionization-density-dependent detectors that emit detectably different signals upon detecting neutrons and gamma rays respectively. In addition, some of the devices 1502 may be configured to detect fast neutrons only, by proton recoil for example, and others to detect slow neutrons only, by neutron capture. Alternatively, some devices 1502 may be configured to detect high energy gamma rays by Compton scattering, while others may be configured to detect low energy gamma rays by photoelectric absorption. Such an array can determine (a) whether a gamma ray source is present in the cargo, (b) if so, where the gamma source is, (c) whether a neutron source is present in the cargo, and (d) if so, where the neutron source is, (e) the isotopic composition of the source in each case, and (f) shielding distributions for each of the above. This information enables faster scanning, faster localization of threats, and faster discrimination of threats from benigns compared to conventional detectors.

Figure 16:
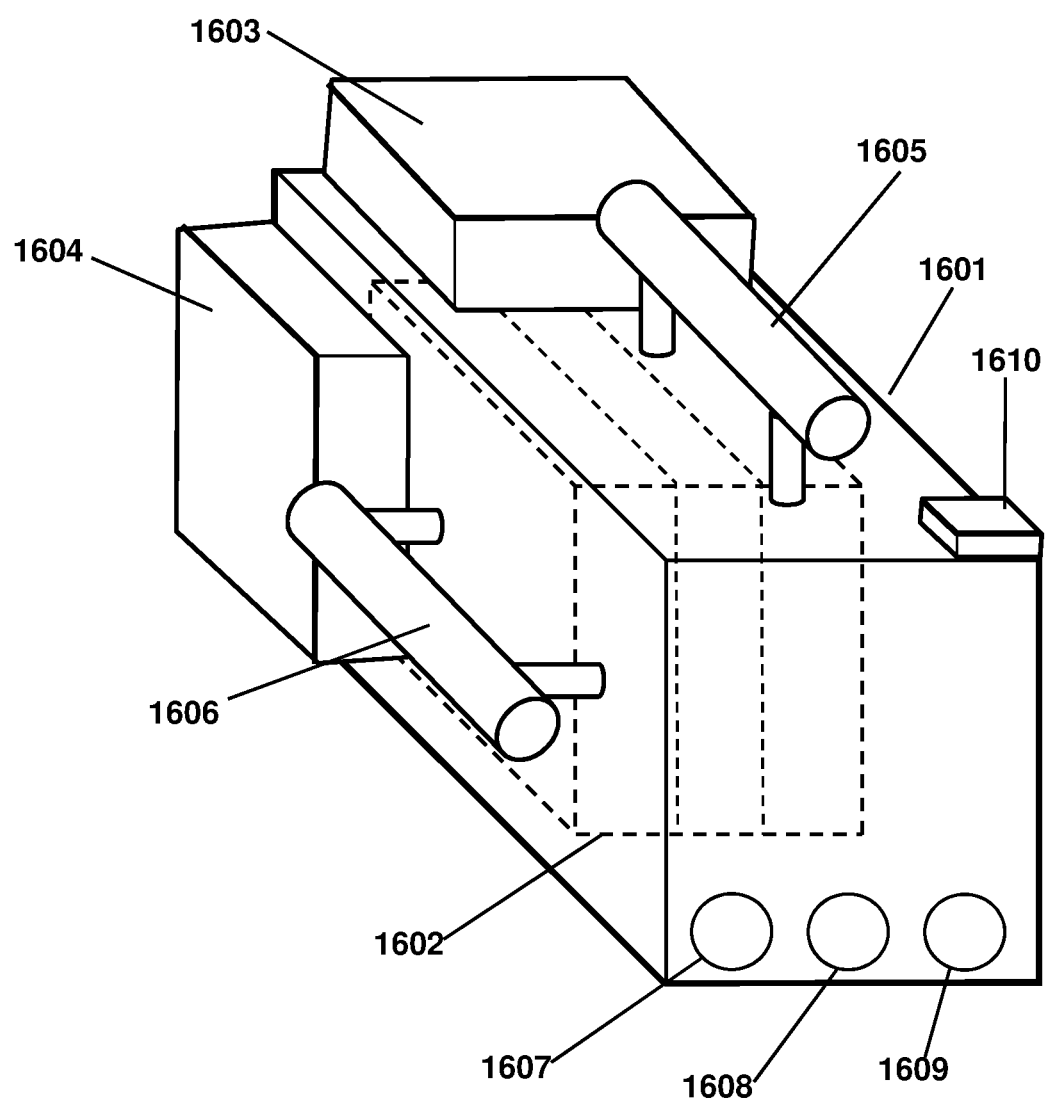
FIG. 16 is a perspective sketch of an exemplary portable directional survey meter, according to some embodiments.

FIG. 16 is a perspective sketch of an exemplary portable radiation survey meter comprising a case 1601 enclosing the directional device 1602 (hidden, shown in dash) and including a display 1603 and a handle 1605 for use in measuring the horizontal angle of a source. The figure also shows a second display 1604 and a second handle 1606 mounted orthogonally on the case 1601, thereby allowing an operator to easily turn the meter on its side, and thereby to scan for sources in the vertical direction.

Also shown notionally are an electronic compass 1607, a GPS receiver 1608, and a multi-axis accelerometer 1609. The compass 1607 can measure the geographical bearing of the device, and thereby enable the embedded processor 1610 to determine the source angle in a ground-based coordinate system. The GPS receiver 1608 can determine the spatial position of the meter, which can then be recorded internally or transmitted to an external receiver. The position of the source can be determined by triangulation using two measurements of the source angle made at two different locations using two separate portable survey meters, or using sequential measurements by the same meter at the two locations.

The accelerometer 1609 can determine when the meter is turned on its side, and also can detect when the meter is moved or rotated quickly. Whenever the meter is rapidly rotated, the displays 1603 and 1604 can be blanked, or changed to show a busy-icon for example, and may remain blanked until sufficient additional detection data are acquired to enable an updated source angle determination. In this way the device can avoid misleading the operator when the device has been rotated quickly and the directional analysis has not yet acquired sufficient data at the new orientation to update the display 1603.

In some embodiments, the processor 1610 may be configured to analyze the detector data and calculate a best-fit source angle continuously, or nearly continuously, while the data is accumulated. Alternatively, the processor 1610 may be configured to update the source angle determination after every particle detection event. Alternatively, the analysis may be performed at preset intervals such as once per second, using whatever data had been accumulated so far. The displayed source angle may be updated continuously even while the meter is rotated, for example by weighting the most recent data higher than the oldest data so as to accommodate the changes in orientation. For example, the processor 1610 can use an averaging routine such as a time-weighted average, or incremental averaging, or a circular buffer average, or other weighted averaging means to update the source angle continually as conditions change.

In some embodiments, the processor 1610 may be configured to perform two parallel analyses having different integration times, one with a short integration time and one with a long integration time. In the short-integration-time procedure, the detector data may be analyzed frequently using a short integration time, and may thereby provide a rapidly updating display of the calculated angle. Concurrently, a long-integration-time analysis may proceed more slowly but may provide a steadier measure of the source angle with lower uncertainty. Both the fast and slow results may be displayed simultaneously, and updated so that the operator can assess the results visually in real time. For example, the two analysis results may be displayed as a compound arrow, or other icon, having a broad portion that indicates the quick low-resolution analysis, overlain by a sharper and more stable icon according to the long-integration-time results. Alternatively, the fast and slow results may be presented using two separate indicators, or by showing other readily-distinguishable indicators on the display.

In some embodiments, the meter may include a manually operated control that allows the operator to adjust the integration time as needed. For example, if the operator needs only a rough measure of the source angle, but needs it quickly, then the operator can adjust the integration time shorter. The device may also include a control by which the operator can freeze the display, thereby enabling a closer review of the results. The device may include means for recording data such as the counting rates in each detector, the calculated source angle, the presence of neutrons, the location or orientation of the device, the overall radiation level, or other data. Sound may be recorded simultaneously so that the operator's comments can be recorded in real time and can be played back later along with the other data. As a further option, the various types of data listed, and other data not listed, can be transmitted to an external receiver and recorded there instead of onboard the device, for additional safety in every contingency.

In some embodiments, the device may include a light beam transmitter configured to produce a light beam. In a first exemplary version, the light beam is aligned with the device, thereby showing exactly where the device is aimed. The light beam may be configured with an asymmetric beam shape, such as a wedge pointing left or right, thereby indicating the sign of the source angle in real-time. The beam spot may be further configured to indicate the magnitude of the source angle as well, for example being elongated when the source angle is large. The beam shape may also be reduced to a circular spot, or caused to flicker, or otherwise visibly modulated, when the source angle is small or zero, thereby indicating exactly when the device is aimed directly at the source location. Such a variable light beam shape, indicating the direction of the source as well as the magnitude of the source angle, greatly assists the operator in locating a source quickly.

In a second exemplary version, the light beam transmitter may be configured to direct the light beam in the direction of the source, for example by rotating the beam by the calculated source angle, thereby bathing the source location in visibly detectable light. The beam may be redirected in this way using, for example, an articulated mirror or other variable optical element, or the light beam transmitter may be mounted on a hinge or gimbal and rotated so as to aim the light beam to the calculated source location. Such a light beam, being continuously directed toward the source position, may appear to remain "sticky" or "locked on" to the source even as the meter is moved around. If the meter is rotated too quickly for the detection data to keep up, the light beam may be gated off or expanded into a broad beam indicating inconsistent data until the source location can again be determined, at which time the light beam can resume dwelling on the source location. In this way the operator can see where the source is located. The light beam may be flickered or otherwise modulated to increase visibility even in daylight.

In some embodiments, the survey meter may include an imaging device such as a still or video camera to record the scene, and particularly to image the source location when it is discovered. The camera may be activated during each acquisition of scintillator data, or manually by an operator, or continuously, or upon a computer command, or whenever the device is rotated, or otherwise. The light beam may be gated off or otherwise modulated while the image or images are acquired. The image may be centered on the calculated source location using a rotatable mirror or by rotating the camera, for example. As the source location uncertainty is steadily improved with additional data, the image may be zoomed in accordingly.

In some embodiments, the meter may include non-visual indicators such as acoustical or haptic indicators, which may be activated according to certain events. For example a haptic or acoustical pulse may indicate that the source angle has been updated. The acoustical or haptic indicators may be triggered when the aiming plane becomes aligned with the source. The acoustical or haptic indicators may be activated and modulated so as to indicate the left-right direction of the source, thereby further assisting the operator in finding it without having to look away from the scene. The acoustical or haptic indicators may be modulated to indicate the magnitude of the source angle, for example being modulated more quickly as the source is approached. Two haptic indicators may be incorporated in a device handle and activated to indicate to the operator whether the source is to the right or left side of the device. The acoustical or haptic indicators may also serve as a hazard warning, by being activated in a characteristic way whenever the radiation level is above a safety threshold.

Figure 17:
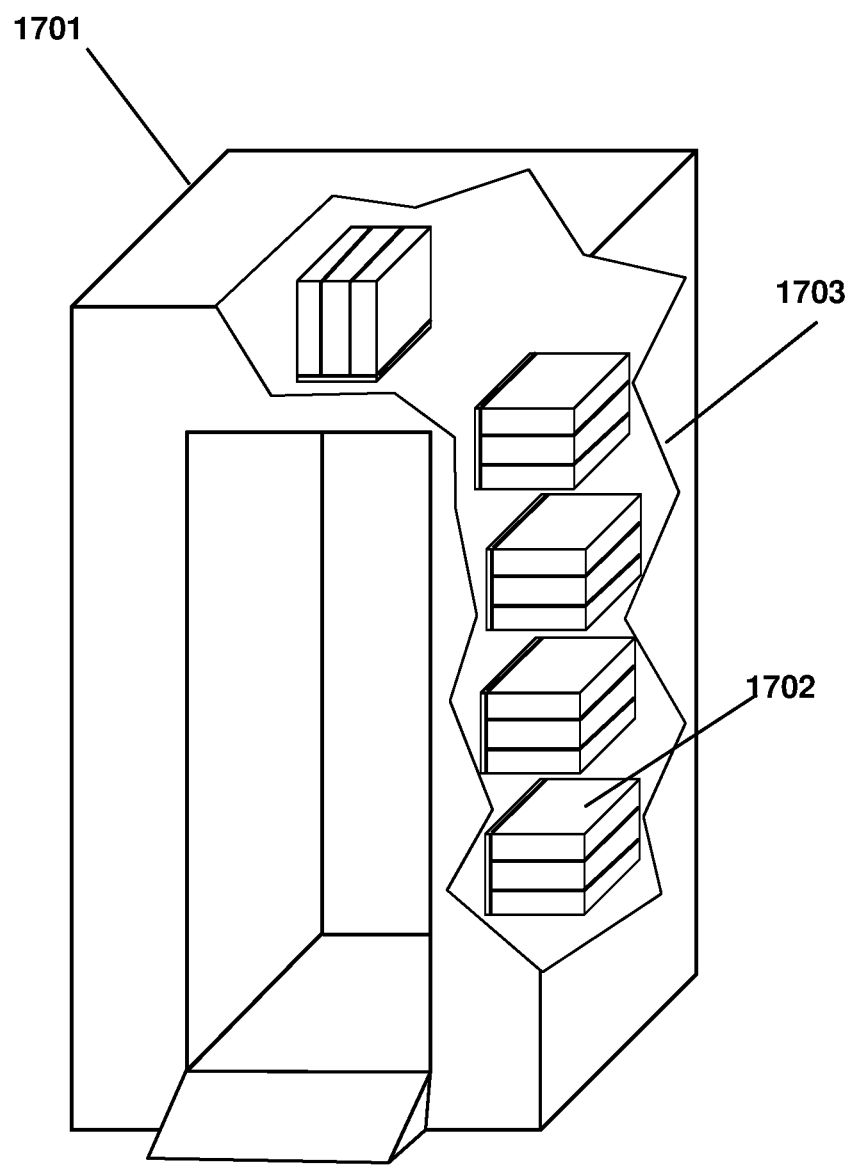
FIG. 17 is a sketch in perspective, partly cut-away, of an exemplary walk-through portal with multiple copies of the directional device arranged in the walls of the portal, according to some embodiments.

FIG. 17 shows in perspective, partially cut-away 1703, an exemplary embodiment of a walk-through portal 1701 in which a plurality of the devices 1702 are mounted. In the portal application, some of the devices 1702 may be mounted with their aiming planes horizontal so that each device 1702 can measure the vertical location of a source. The portal can thus provide a very sensitive detection of smuggled radioactive material, and can also indicate whether the material is hidden in the person's shoes or pockets or hair or body cavity or wherever. This provides enhanced safety by detecting contamination on workers, and also prevents loss or pilfering of radioactive material.

Figure 18:
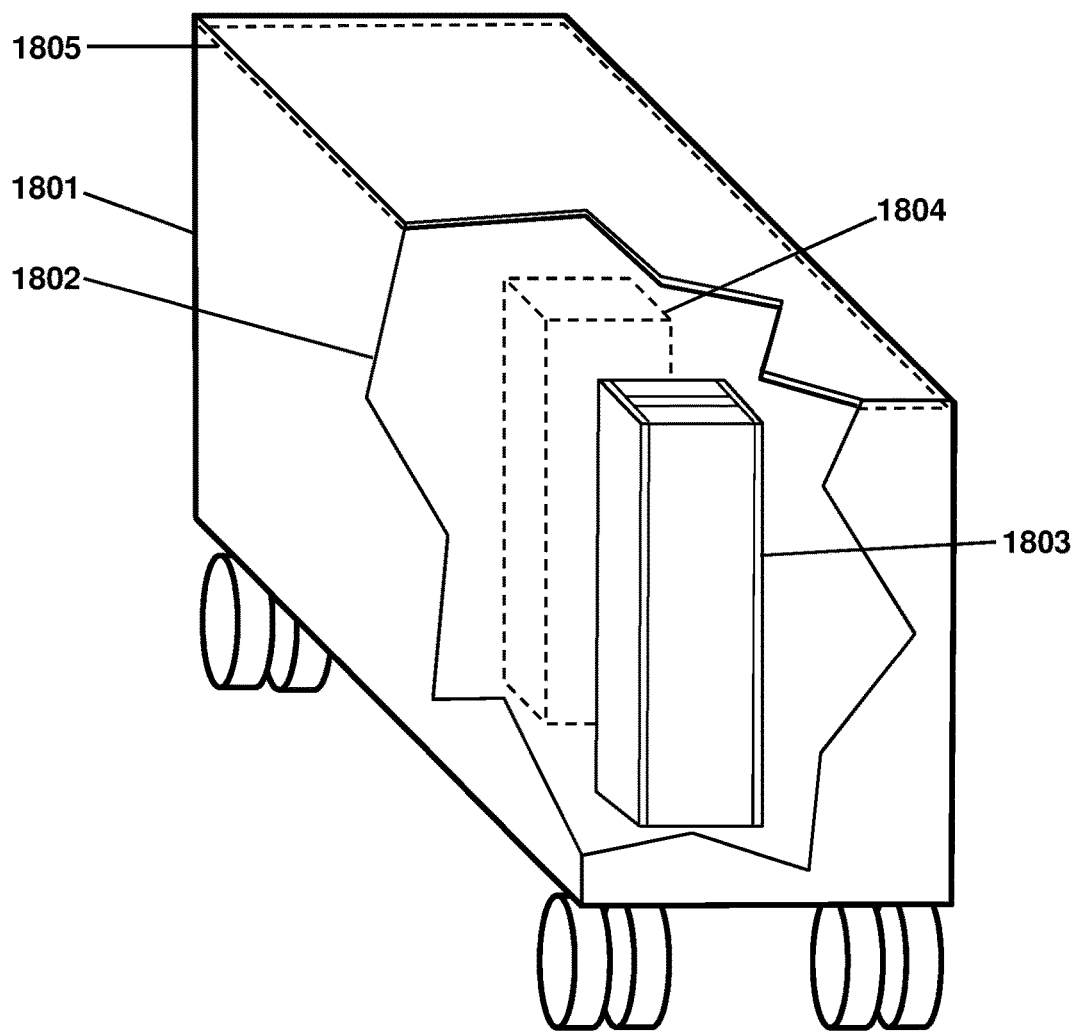
FIG. 18 is a sketch in perspective, partly cut-away, of an exemplary mobile radiation scanner containing multiple copies of the directional device, according to some embodiments.

FIG. 18 shows in perspective an exemplary embodiment of a mobile radiation scanner vehicle 1801 which can detect hidden sources in, for example, an urban environment. The scanner 1801, partially cut-away 1802, includes a directional device 1803 as disclosed herein. The device 1803 may be elongated in the vertical direction, for example extending the full height of the scanner vehicle 1801, to maximize the detection area. As shown, the device 1803 is preferably of the bidirectional type as disclosed in FIG. 10, with two symmetrically placed orthogonal detectors front and back, thereby providing efficient detection of particles from all around the scanner vehicle 1801. Also shown notionally, in dash, are additional copies 1804 of the device 1803. The additional copies 1804 may be arranged as a wall of the devices 1803, along the centerline of the scanner vehicle 1801, and preferably fitting as many such devices 1803 as possible while still providing space between them to avoid self-shadowing. Also shown is an optional cosmic ray veto counter 1805 comprising a plastic scintillator, for rejecting cosmic ray backgrounds.

As the scanner 1801 is driven around an inspection region, the various detector counting rates may be recorded in real-time, along with the GPS coordinates and bearing. Due to the motion of the scanner vehicle 1801, the directional data may be sufficient to generate a radiation map of the area by fitting the results to a two-dimensional radiation distribution, for example. The radiation map may be superposed on or otherwise related to a map of the area including buildings and other structures for example. High sensitivity may be achieved due to the large area of the array of detector devices 1603, as well as the high efficiency and angular directionality of each device 1803, according to some embodiments. After a detailed radiation map is completed, any future changes to the radiation distribution may be detected in subsequent scans, triggering a secondary scan such as longer scan times with energy-resolved detectors to identify the isotopic composition of the new sources.

As an option, some of the devices 1803 may comprise neutron-sensitive gamma-blind detector material so as to map the neutron background distribution, while others are neutron-blind gamma-sensitive, so that both types of radiation can be mapped at the same time. In addition, some of the devices 1803 may be configured to detect low energy gamma rays while others detect high-energy gammas, and likewise some of the devices 1803 may be configured to detect only low energy neutrons or only high energy neutrons. Most naturally-occurring background neutrons have low energy, due to multiple scattering in the atmosphere, whereas neutrons from weapon materials are generally high energy of 1 MeV to a few MeV. Detecting even a few high energy neutrons coming from the same location may be suspicious.

Figure 19:
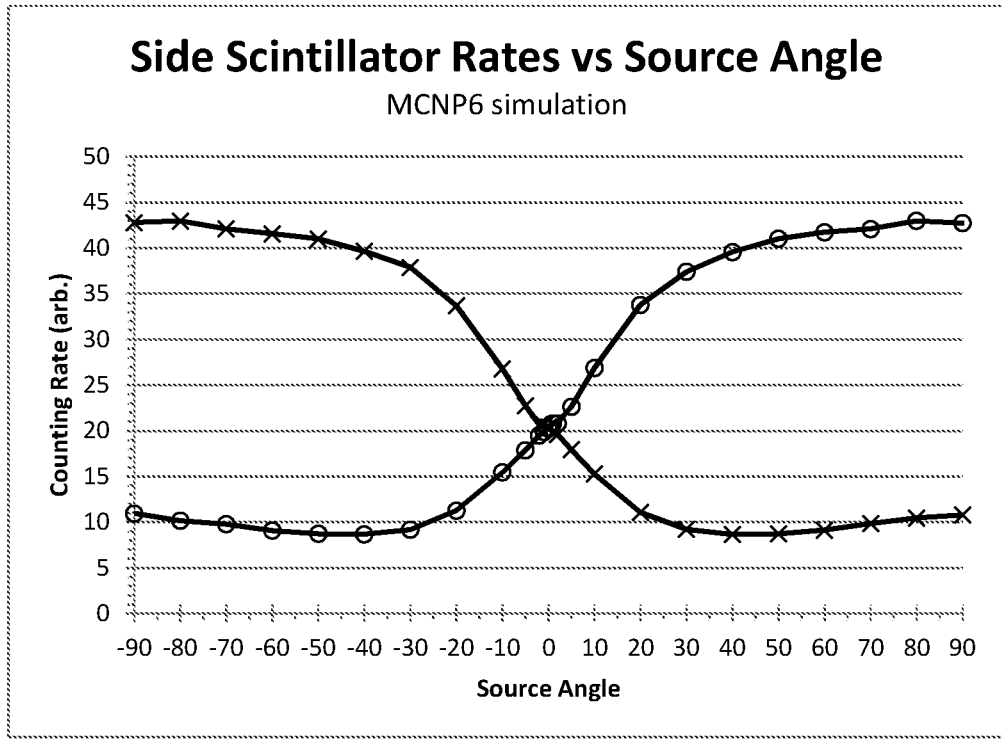
FIG. 19 is a graph from an MCNP6 simulation showing the counting rates of the two side detectors versus the source angle, according to some embodiments.

FIG. 19 is a graph showing the results of a simulation using the MCNP6 software, in which simulated gamma rays from a source were detected in a simulated device according to the present disclosure. Neutrons were also tested in a similar study and produced nearly identical results to the gamma ray results presented here. The graph shows the detection rates in the side detectors, versus source angle, using a simulated configuration such as that of FIG. 1. The data were obtained assuming 35 mm thick PVT side detectors and a 20 mm thick Pb shield, with no protrusion or truncation. The source was a 1.0 MeV isotropic gamma source. The aiming plane was pointed at zero degrees in the simulation and the source was moved around the device from −90 to +90 degrees. The curve shown with O's is the counting rate, in arbitrary units, for one of the side detectors versus the source angle. The curve exhibits a high counting rate when the source is at +90 degrees, and drops to a low counting rate when the source is moved around to −90 degrees relative to the aiming plane, which is expected since the shield blocks the gammas on the opposite side. The other side detector, marked with X's, shows a high rate when the source is at −90 degrees, and a low rate at +90 degrees due to the shield. The two detectors exhibit the same counting rate at zero degrees, since they are both equally exposed to the source when it is aligned with the aiming plane.

Figure 20:
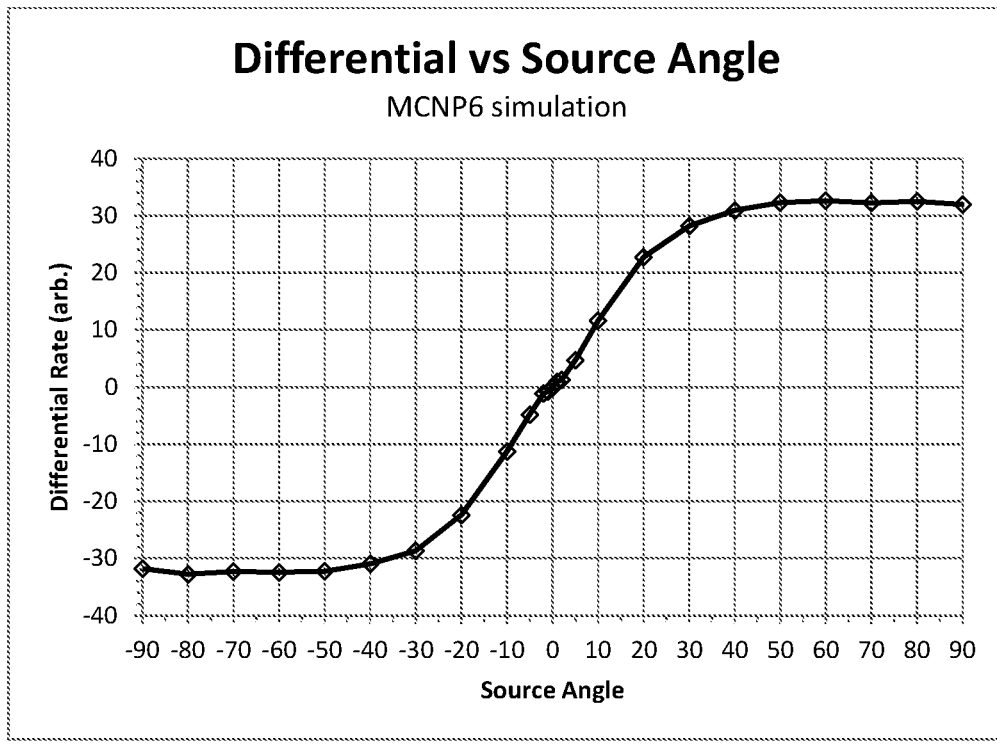
FIG. 20 is a graph from the simulation of FIG. 19, showing the calculated differential versus source angle, according to some embodiments.

FIG. 20 is a graph showing the calculated differential between the two side detector counting rates for the simulation of FIG. 19. The differential equals the counting rate of the first side detector minus the second side detector rate. The differential curve is a smooth antisymmetric distribution centered on the source location.

Figure 21:
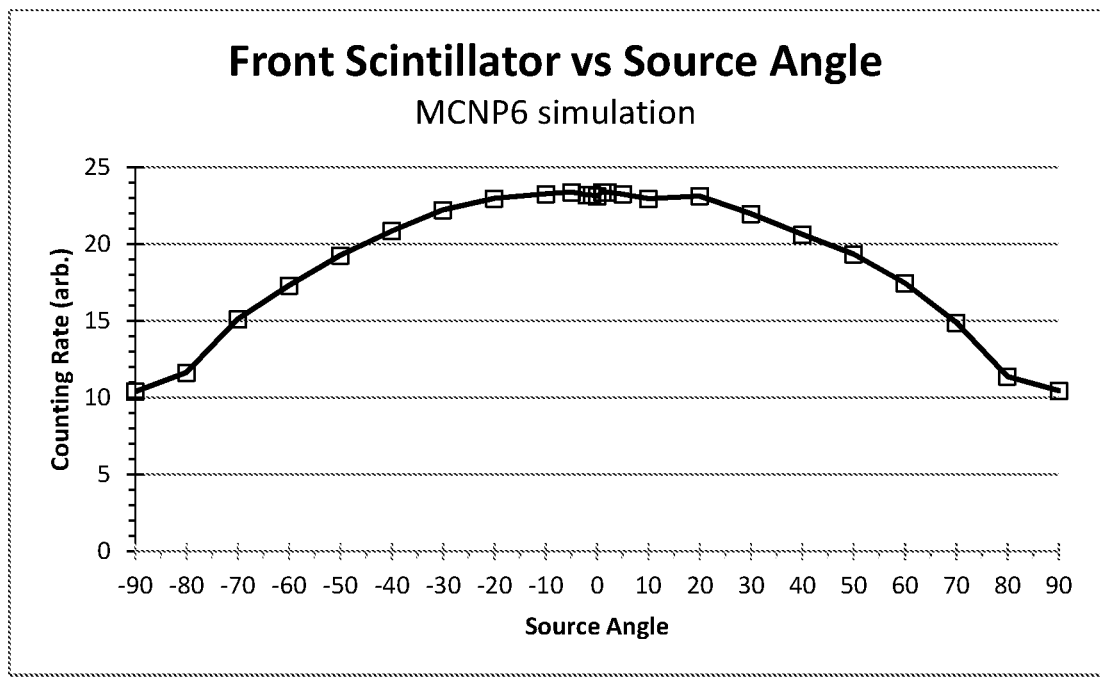
FIG. 21 is a graph from the simulation of FIG. 19, showing the counting rate of the front detector versus the source angle, according to some embodiments.

FIG. 21 is a graph from the simulation of FIG. 19, showing the counting rate for the front detector versus source angle. The front detector was BGO in the simulation, 10 mm thick and 90 mm wide, mounted directly in front of the shield and side detectors. As expected, the front detector had a high detection rate when the device was aimed at the source at zero degrees, and a fully symmetric distribution.

Figure 22:
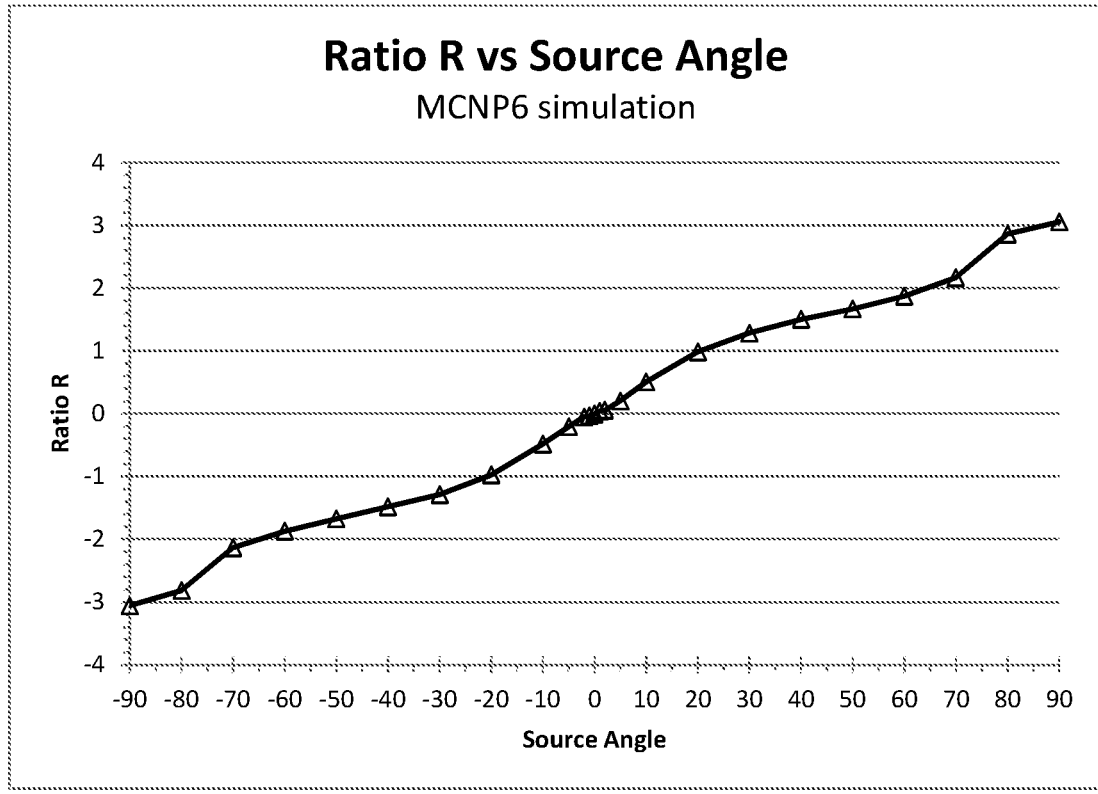
FIG. 22 is a graph based on the simulation of FIG. 19, showing the angular correlation function that relates the source angle to the counting rate ratio, according to some embodiments.

FIG. 22 is a graph showing the angular correlation between the source angle and the ratio R=D/S3 where D is the differential between the two side detector counting rates as shown in FIG. 20, and S3 is the front detector counting rate of FIG. 21. The differential has an anti-symmetric sensitivity distribution, as can be seen in FIG. 20 since the values to the left of zero degrees are the negative of the values to the right. The front detector angular sensitivity of FIG. 21, on the other hand, has a symmetrical response since the values to the left of zero degrees are about equal to the values on the right side. The two angular sensitivities are sufficiently different that an angular correlation function, shown in FIG. 22, can determine the source angle, both sign and magnitude, from the scintillator rates alone.

To use the angular correlation function, the particle detection rates may first be acquired for all the detectors, and the differential D may be found by subtracting the counting rate of the first side detector from the second side detector. Then that differential may be divided by the front detector rate, thereby obtaining the ratio R. Then, reading across the horizontal axis of FIG. 22 to the angle that corresponds to the calculated value of R, the curve at that point indicates the corresponding source angle. The correlation is monotonic, meaning that a unique source angle can be found from R.

Optionally, and equivalently, the inverse of the correlation function can be used by inverting the horizontal and vertical axes of FIG. 22 and reading the angle from the vertical axis corresponding to the value of R on the horizontal axis. As a further option, the inverse of R can be used to calculate the source angle; however the inverse of R becomes problematic when the two side detector counting rates are equal.

Figure 23:
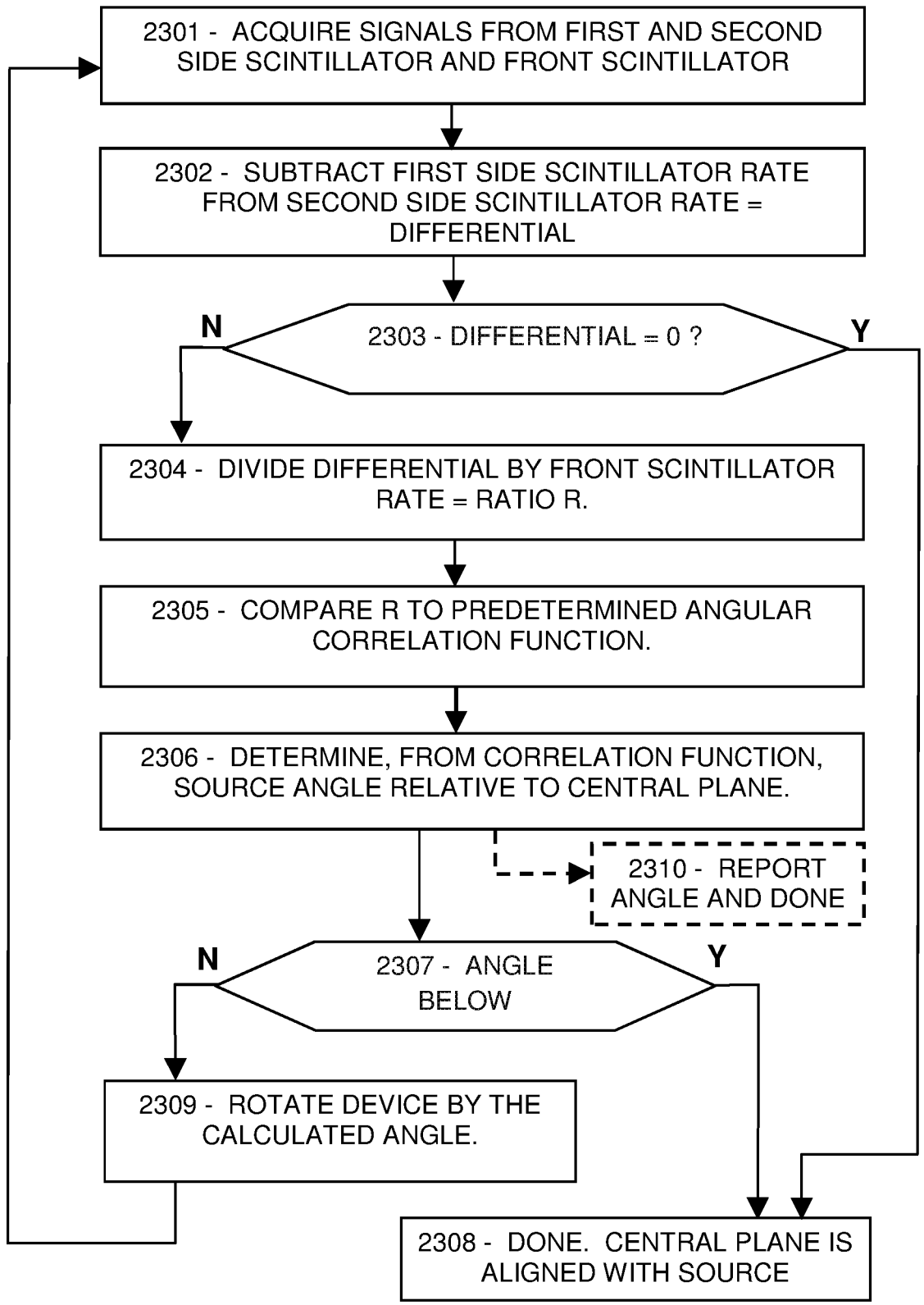
FIG. 23 is a flowchart showing steps of an exemplary method for calculating the source angle and rotating the device to verify, according to some embodiments.

FIG. 23 is a flowchart showing the steps of an exemplary method for determining the source angle and optionally for rotating the device until it is in alignment with the source. First (2301) the side detector particle detection rates and the front detector particle detection rates may be measured with the device at an arbitrary initial orientation. Then, (2302) the rates for one side detector may be subtracted from the other, thereby obtaining a differential. Then, (2303) the differential may be checked to see if it is close to zero, or within some limit of zero. If so, then the task is complete (2308) and the aiming plane is aligned with the source. If the aiming plane is not yet aligned with the source, the ratio R may be calculated (2304) by dividing the differential by the front detector rate. R may then be compared (2305) to a predetermined correlation function, and the source angle may be determined (2306) as the particular angle that matches the predetermined angular correlation function at the ratio R.

In some applications, it is sufficient to localize the source, and there is no need to aim the device at the source location. In that case (2310, shown in dash), the angle may be displayed or transmitted or otherwise reported, and the method terminates.

In other applications, the device is required to finally point directly at the source. In that case (2307) the calculated source angle may be compared to a threshold, such as one degree. If the source angle, as calculated from the counting rate data, is below the threshold, the device is satisfactorily aligned with the source, and the method terminates (2308). If the calculated source angle is not below that threshold, then the device may be rotated (2309) according to the calculated angle, and the rates may again be acquired (2301) and the alignment criteria again tested. In most embodiments, a single rotation is sufficient to align the device with the source.

Figure 24:
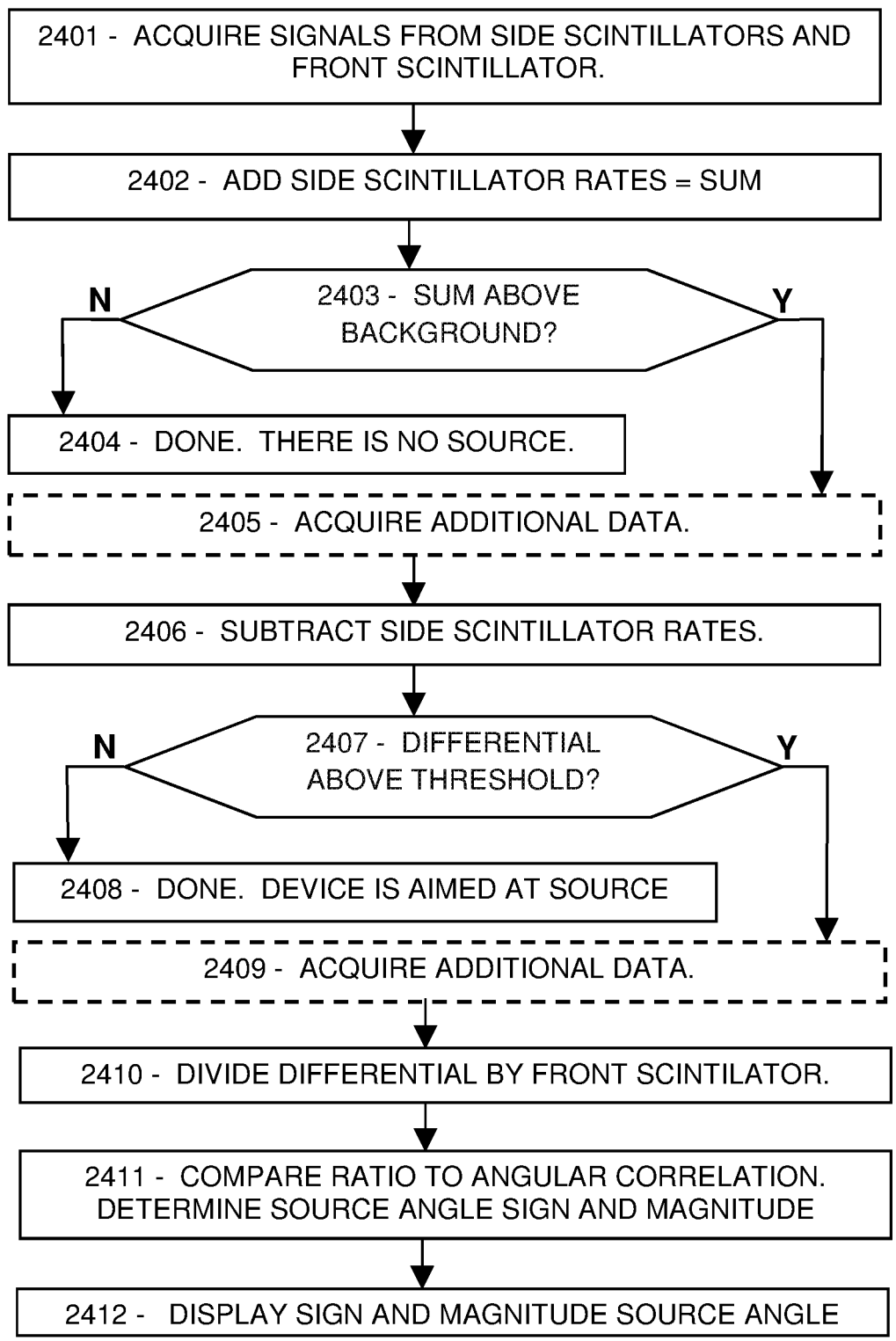
FIG. 24 is a flowchart showing steps of an exemplary staged analysis method to optimize the use of low detection rates, according to some embodiments.

FIG. 24 is a flowchart showing an exemplary method for determining the source angle in stages. First (2401) signals may be acquired and counting rates may be calculated for the side detectors and the front detector during a first integration time. The side detector rates may be added (2402) and the sum may be compared to a predetermined background rate (2403). If the summed signals are not significantly above background levels (2404), the device may indicate that no source is present, or at least no source is yet detected. But if the sum of the side detector rates is above the normal backgrounds, then the source is detected but not yet localized. Additional data may then be acquired (2405) for the angle calculation. For example, if the sum is just barely above background, it may be necessary to acquire additional data during a second integration time to enable a reliable angular analysis.

Then, after acquiring additional data, the differential may be calculated (2406) by subtracting one of the side detector rates from the other, and the differential may be compared (2407) to a predetermined threshold. If the differential is below the threshold, this indicates that the aiming plane is sufficiently aligned with the source, and the task is done (2408). If the differential is not zero, or is not below a predetermined threshold, then additional detector data may then be acquired (2409) in a third integration time if needed for determining the magnitude of the angle. The decision as to whether this third acquisition is needed may depend on the number of counts in the front detector. For example, additional data may be required if the front detector counting rate (minus background) is comparable to its statistical uncertainty.

Then, the source angle may be calculated by dividing the differential by the front detector rate (2410) and comparing the ratio to the predetermined angular correlation function (2411). The source location or source angle may then be reported (2412) by displaying it on a screen, or transmitting it to a facility computer, or storing it in non-transient media, or otherwise responding according to the application needs.

Optionally, a fourth acquisition may be carried out to reduce the angular uncertainty in the result. If a source is present, it is usually worth taking extra data to obtain the best value possible.

Optionally, after the device has been rotated to the predicted source location, fresh detection data may be acquired there. The sequential steps shown in the chart may then be repeated, but now with the aiming plane substantially aligned with the source, such that the differential is nearly zero and the computed source angle is nearly zero, thereby confirming the alignment.

Embodiments of the device disclosed herein can provide many advantages over conventional detectors. (a) Embodiments of the device can determine the full sign and magnitude of the angle between the aiming plane and the source, and (b) can do so in a single acquisition interval at a single device orientation. (c) If rotated according to the calculated source angle, embodiments can converge on the source location in only one step usually. (d) Embodiments can achieve high detection efficiency because the detectors nearly cover the shield, thereby obtaining an unobstructed view of the source particles regardless of the orientation of the device. (e) The device in many embodiments is compact, low-cost, easy to implement in an inspection environment, suitable for a variety of important security scanning applications, and virtually immune to defeat by shielding or obfuscation.

As a result of these and other advantages, the device disclosed herein may enable applications including cargo inspection, walk-through portals, portable survey meters, mobile scanners searching for radiation in the environment, and many other critical applications. Advanced radiation detection systems like those disclosed herein will be needed in the coming decades to protect innocent people from the threat of nuclear and radiological terrorism.

The embodiments and examples provided herein illustrate the principles of the invention and its practical application, thereby enabling one of ordinary skill in the art to best utilize the invention. Many other variations and modifications and other uses will become apparent to those skilled in the art, without departing from the scope of the invention, which is to be defined by the appended claims.

What is claimed is:

1. A device for locating a radioactive source comprising:
    a shield configured to block particles from the source, and positioned parallel to an aiming plane that extends from the back to the front of the device;
    two side detectors, each side detector configured to emit a signal upon detecting an energetic electron or ion, the two side detectors being positioned parallel to the shield on opposite sides of the shield respectively;
    a front detector configured to emit a signal upon detecting an energetic electron or ion, and positioned frontward of the side detectors; and
    a processor comprising digital electronics configured to determine a source angle comprising the angle between the central plane and the source.

2. The device of claim 1, wherein the processor is configured to perform a method comprising:
    measuring particle detection data in the front detector and in the side detectors respectively;
    calculating a ratio based at least in part on the detection data of the front detector and based at least in part on the detection data of the side detectors; and
    comparing the ratio to a predetermined angular correlation function that relates particle directions to particle detection data, thereby determining the source angle.

3. The device of claim 1, wherein the device further comprises a shield slug, positioned frontward of the front detector, and configured to block or attenuate the particles.

4. The device of claim 1, wherein the back end of the shield is truncated, relative to the back ends of the side detectors.

5. The device of claim 1, wherein the shield is tapered in cross-section.

6. The device of claim 1, wherein the shield comprises transparent material optically coupled to at least one of the detectors.

7. The device of claim 1, wherein the shield is configured to detect an energetic electron or ion, and to measure the energy of the energetic electron or ion with an energy uncertainty of at most 10%.

8. The device of claim 1, wherein the shield is configured to emit a first signal upon detecting an energetic ion, and to emit a second signal, different from the first signal, upon detecting an energetic electron.

9. The device of claim 1, wherein the side detectors are configured to measure the energy of the energetic electron or ion with an energy uncertainty of at most 10%.

10. The device of claim 1, wherein the front edge of each side detector is beveled.

11. The device of claim 1, wherein each side detector comprises a top portion and a bottom portion respectively, and the processor is configured to compare signals of the top portions to signals of the bottom portions, thereby determining whether the source is above or below the device.

12. The device of claim 1, wherein a light sensor views both side detectors.

13. The device of claim 1, wherein the shield protrudes frontwardly beyond the side detectors.

14. The device of claim 1, wherein:
    the front detector comprises a left front detector and a right front detector, wherein the left and right front detectors are on opposite sides of the aiming plane respectively, and are both frontward of the side detectors;
    the processor is configured to add data associated with the left front detector to data associated with the right front detector.

15. The device of claim 14, wherein:
    the left front detector is optically coupled to the left side detector and is configured to produce detectably different signals than the left side detector; and
    the right front detector is optically coupled to the right side detector and is configured to produce detectably different signals than the right side detector.

16. The device of claim 1, wherein the front detector is one of a plurality of front detectors positioned frontward of the side detectors, wherein each of the plurality of front detectors is configured to emit a signal upon detecting an energetic electron or ion.

17. The device of claim 1, further including a back detector configured to emit a signal upon detecting an energetic electron or ion, wherein the back detector is positioned behind the side detectors.

18. The device of claim 17, wherein the processor is configured to compare signals associated with the front detector and signals associated with the back detector.

19. The device of claim 1, wherein the front detector is divided into an upper front detector and a lower front detector, and the upper front detector is perpendicular to the lower front detector.

20. The device of claim 1, wherein the device is mounted in a case having two handles mounted on orthogonal surfaces of the case.

* * * * *